US012776567B2

(12) United States Patent
Hwang et al.

(10) Patent No.: US 12,776,567 B2
(45) Date of Patent: Oct. 27, 2026

(54) ELECTRONIC DEVICE INCLUDING ANTENNA

(71) Applicant: SAMSUNG ELECTRONICS CO., LTD., Suwon-si (KR)

(72) Inventors: Soonho Hwang, Suwon-si (KR); Kyungjae Lee, Suwon-si (KR); Sungkoo Park, Suwon-si (KR); Himchan Yun, Suwon-si (KR); Kookjoo Lee, Suwon-si (KR); Donguk Choi, Suwon-si (KR); Seunghwan Kim, Suwon-si (KR); Jaebong Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 421 days.

(21) Appl. No.: 18/381,741

(22) Filed: Oct. 19, 2023

(65) Prior Publication Data

US 2024/0072416 A1 Feb. 29, 2024

Related U.S. Application Data

(63) Continuation of application No. PCT/KR2023/010751, filed on Jul. 25, 2023.

(30) Foreign Application Priority Data

Jul. 29, 2022 (KR) ........................ 10-2022-0094349
Aug. 9, 2022 (KR) ........................ 10-2022-0099540

(51) Int. Cl.
*H01Q 1/50* (2006.01)
*H01Q 1/24* (2006.01)
(Continued)

(52) U.S. Cl.
CPC ............... *H01Q 1/243* (2013.01); *H01Q 1/50* (2013.01); *H01Q 1/526* (2013.01); *H04M 1/0214* (2013.01)

(58) Field of Classification Search
CPC .......... H01Q 1/243; H01Q 1/50; H01Q 1/526; H04M 1/0214
See application file for complete search history.

(56) References Cited

U.S. PATENT DOCUMENTS 9,728,854 B2 8/2017 Kim et al.
10,135,121 B2 11/2018 Park et al.
(Continued)

FOREIGN PATENT DOCUMENTS

CN 111525238 A 8/2020
CN 110445915 A 2/2021
(Continued)

OTHER PUBLICATIONS

Communication dated Sep. 4, 2025, issued by the European Patent Office in counterpart European Application No. 23846964.7.
(Continued)

*Primary Examiner* — Henry Luong
(74) *Attorney, Agent, or Firm* — Sughrue Mion, PLLC

(57) ABSTRACT

An electronic device includes: a housing forming an exterior of the electronic device; a first display; a second display facing in a direction different from that of the first display, wherein the second display may include a conductive pattern; a metal part electrically connected to the conductive pattern; and a wireless communication circuit electrically connected to at least one of the metal part or the conductive pattern.

18 Claims, 14 Drawing Sheets

(51) Int. Cl.
*H01Q 1/52* (2006.01)
*H04M 1/02* (2006.01)

(56) References Cited

U.S. PATENT DOCUMENTS

| | | | |
|---|---|---|---|
| 10,474,282 B2 | 11/2019 | Park et al. | |
| 10,971,809 B2 | 4/2021 | Shin et al. | |
| 11,137,798 B2 | 10/2021 | Ju et al. | |
| 11,252,268 B2 | 2/2022 | Lee et al. | |
| 2017/0285844 A1* | 10/2017 | Park | G06F 1/1647 |
| 2020/0235463 A1* | 7/2020 | Cha | H01Q 1/2266 |
| 2021/0098862 A1 | 4/2021 | Noh | |
| 2021/0333823 A1 | 10/2021 | Maric et al. | |
| 2022/0123469 A1 | 4/2022 | Hsu et al. | |
| 2022/0210256 A1 | 6/2022 | Park et al. | |
| 2023/0336648 A1 | 10/2023 | Lee et al. | |

FOREIGN PATENT DOCUMENTS

| | | | | |
|---|---|---|---|---|
| CN | 113285207 A | 8/2021 | | |
| KR | 10-2014-0118120 A | 10/2014 | | |
| KR | 10-2016-0027700 A | 3/2016 | | |
| KR | 10-2017-0112494 A | 10/2017 | | |
| KR | 10-2020-0046246 A | 5/2020 | | |
| KR | 10-2020-0103411 A | 9/2020 | | |
| KR | 10-2021-0121265 A | 10/2021 | | |
| KR | 10-2021-0152910 A | 12/2021 | | |
| KR | 10-2022-0056627 A | 5/2022 | | |
| KR | 10-2022-0089344 A | 6/2022 | | |
| KR | 10-2022-0091980 A | 7/2022 | | |
| WO | WO-2021246687 A1 * | 12/2021 | | G06F 1/1652 |

OTHER PUBLICATIONS

International Search Report (PCT/ISA/210) issued Oct. 26, 2023 by the International Searching Authority in International Patent Application No. PCT/KR2023/010751.

Written Opinion (PCT/ISA/237) issued Oct. 26, 2023 by the International Searching Authority in International Patent Application No. PCT/KR2023/010751.

* cited by examiner

ELECTRONIC DEVICE INCLUDING ANTENNA

CROSS-REFERENCE TO RELATED APPLICATIONS

This application is a by-pass continuation of International Application No. PCT/KR2023/010751, filed on Jul. 25, 2023, which is based on and claims priority to Korean Patent Application No. 10-2022-0094349, filed on Jul. 29, 2022, and Korean Patent Application No. 10-2022-0099540, filed on Aug. 9, 2022, both filed in the Korean Intellectual Property Office, the disclosures of which are incorporated by reference herein in their entireties.

BACKGROUND

1. Field

The disclosure relates to an electronic device including an antenna.

2. Description of Related Art

With the advancement of wireless communication technology, electronic devices such as smartphones are commonly used in daily life, and content usage is increasing correspondingly. An electronic device may include a plurality of antennas to support various communication techniques.

As the range of usable applications widens, the number of antennas included in an electronic device increases. As parts for various functions are being added while electronic devices are becoming slimmer, it is becoming more difficult to design an antenna in a limited space for securing antenna radiation performance in a desired frequency band or securing coverage (communication range).

SUMMARY

The disclosure provides an electronic device including an antenna for securing or improving antenna radiation performance.

The technical objectives to be achieved in the disclosure are not limited to those described above, and other technical objectives not mentioned will be understood by those skilled in the art to which the disclosure belongs from the following description.

According to an aspect of the disclosure, an electronic device includes: a housing forming an exterior of the electronic device; a first display; a second display facing in a direction different from that of the first display, wherein the second display may include a conductive pattern; a metal part electrically connected to the conductive pattern; and a wireless communication circuit electrically connected to at least one of the metal part or the conductive pattern.

The metal part may form a portion of the exterior of the electronic device.

The electronic device may further include a camera, and the metal part may be connected to the camera.

The second display may further include a plurality of layers and the conductive pattern may include a layer of the plurality of layers.

The conductive pattern may be configured to shield the second display from electromagnetic interference.

The electronic device may further include a front surface and a rear surface facing in a direction opposite to the front surface, the first display may be disposed on the front surface, and the second display and the metal part may be disposed on the rear surface.

The housing may include a side including a conductive part, wherein the side extends along an edge of the first display and forms a side surface of the electronic device, and at least one of the metal part or the conductive pattern may be electrically connected to the conductive part of the side.

The housing may be configured to allow the first display to be folded.

The housing may include a first housing, a second housing, and a hinge section connects the first housing and the second housing, the first display may include a first display area disposed in the first housing, a second display area disposed in the second housing, and a third display area extending the first display area and the second display area and positioned in correspondence to the hinge section, the second display may be disposed in the first housing, the direction in which the second display faces may be opposite to a direction in which the first display area faces, and the metal part may be disposed in the first housing.

The electronic device may further include a matching circuit disposed on an electrical path electrically connecting at least one of the metal part or the conductive pattern to the wireless communication circuit.

The electronic device may further include a matching circuit disposed on an electrical path electrically connecting the metal part and the conductive pattern.

The wireless communication circuit may be electrically connected to a plurality of positions on at least one of the metal part or the conductive pattern.

The electronic device may further include a plurality of electrical paths electrically connecting the metal part and the conductive pattern.

At least one of the metal part or the conductive pattern may be electrically grounded.

The electronic device may further include a printed circuit board accommodated in the housing and having the wireless communication circuit disposed thereon, and at least one of the metal part or the conductive pattern may be electrically connected to the wireless communication circuit through a flexible conductive part disposed on the printed circuit board.

According to an aspect of the disclosure, an electronic device includes: a housing configured to be foldable along an axis, wherein the housing may include a first side, a second side, and a side part disposed between the first side and the second side; a display disposed on the second side of the housing, wherein the display may include a conductive pattern; a metal part disposed on the second side of the housing; and a wireless communication circuit, wherein the housing is configured to fold inward when the housing is in a folded state and the second side forms an exterior of the electronic device when the housing is in the folded state, the side part may include a conductive part, and the conductive part of the side part, the conductive pattern of the display, and the metal part are electrically connected to the wireless communication circuit.

The display may include a plurality of layers and the conductive pattern may include a layer of the plurality of layers.

The conductive pattern may be configured to shield the display from electromagnetic interference.

The conductive part of the side part may be electrically connected to the metal part, and the conductive pattern of the display is electrically connected to the metal part.

The electronic device may further include a matching circuit, the conductive part of the side part may be electrically connected to the metal part by a first connector, the conductive pattern of the display may be electrically connected to the metal part by a second connector, the wireless communication circuit may be electrically connected to at least one of the conductive part of the side part, the conductive pattern of the display, or the metal part by a third connector, the conductive part of the side part, the conductive pattern of the display, the metal part, the first connector, the second connector, and the third connector may form an antenna, and the matching circuit may be electrically connected to the antenna and is configured to modify a resonant frequency of the antenna.

An electronic device including an antenna according to one or more example embodiment of the disclosure may secure or improve antenna radiation performance.

Other effects that can be obtained or predicted due to various embodiments of the disclosure may be directly or implicitly disclosed in the detailed description of the embodiments of the disclosure.

BRIEF DESCRIPTION OF THE DRAWINGS

The above and other aspects, features, and advantages of certain embodiments of the disclosure will become more apparent from the following detailed description taken in conjunction with the accompanying drawings, in which.

DETAILED DESCRIPTION

Hereinafter, various example embodiments of the disclosure disclosed herein will be described in greater detail with reference to the accompanying drawings.

Figure 1:
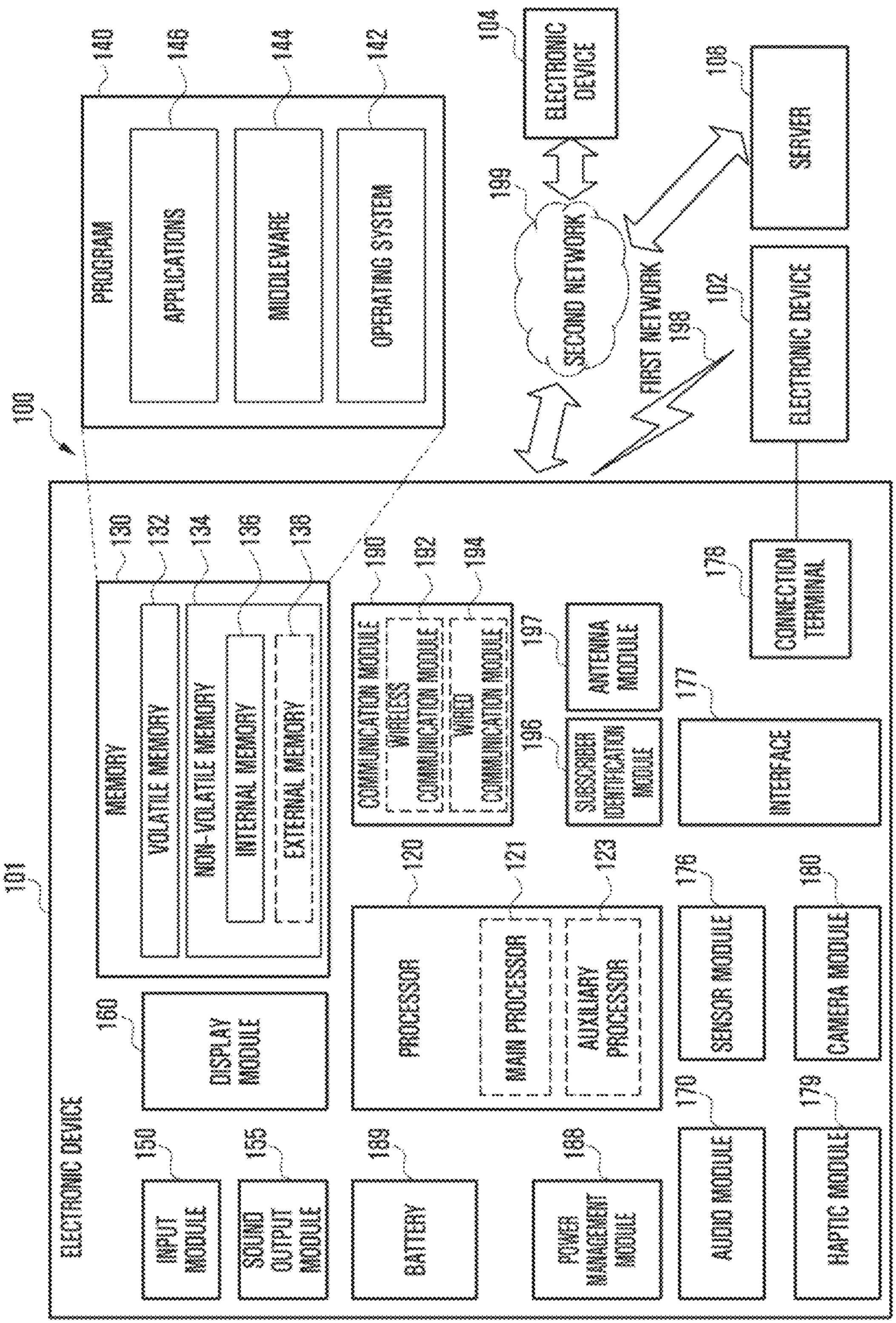
FIG. 1 is a block diagram of an electronic device in a network environment according to an embodiment of the disclosure.

FIG. 1 is a block diagram of an electronic device 101 in a network environment 100 according to an embodiment of the disclosure.

Referring to FIG. 1, the electronic device 101 in the network environment 100 may communicate with an external electronic device 102 via a first network 198 (e.g., a short-range wireless communication network), or at least one of an external electronic device 104 or a server 108 via a second network 199 (e.g., a long-range wireless communication network). The electronic device 101 may communicate with the external electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121.

Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may be any of a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network, or a combination of two or more of the above-mentioned networks, but is not limited the above-mentioned examples. In addition to the hardware structure, the artificial intelligence model may additionally or alternatively include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the external electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support high-speed transmission of high-capacity data (i.e., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full-dimensional MIMO (FD-MIMO), array antenna, analog beam-forming, or large-scale antenna. The wireless communication module 192 may support various requirements specified in the electronic device 101, an external electronic device (e.g., external the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL) or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide an ultra-low delay service using, for example, distributed computing or MEC. In another embodiment of the disclosure, the external electronic device 104 may include an internet of things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). If an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

The term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
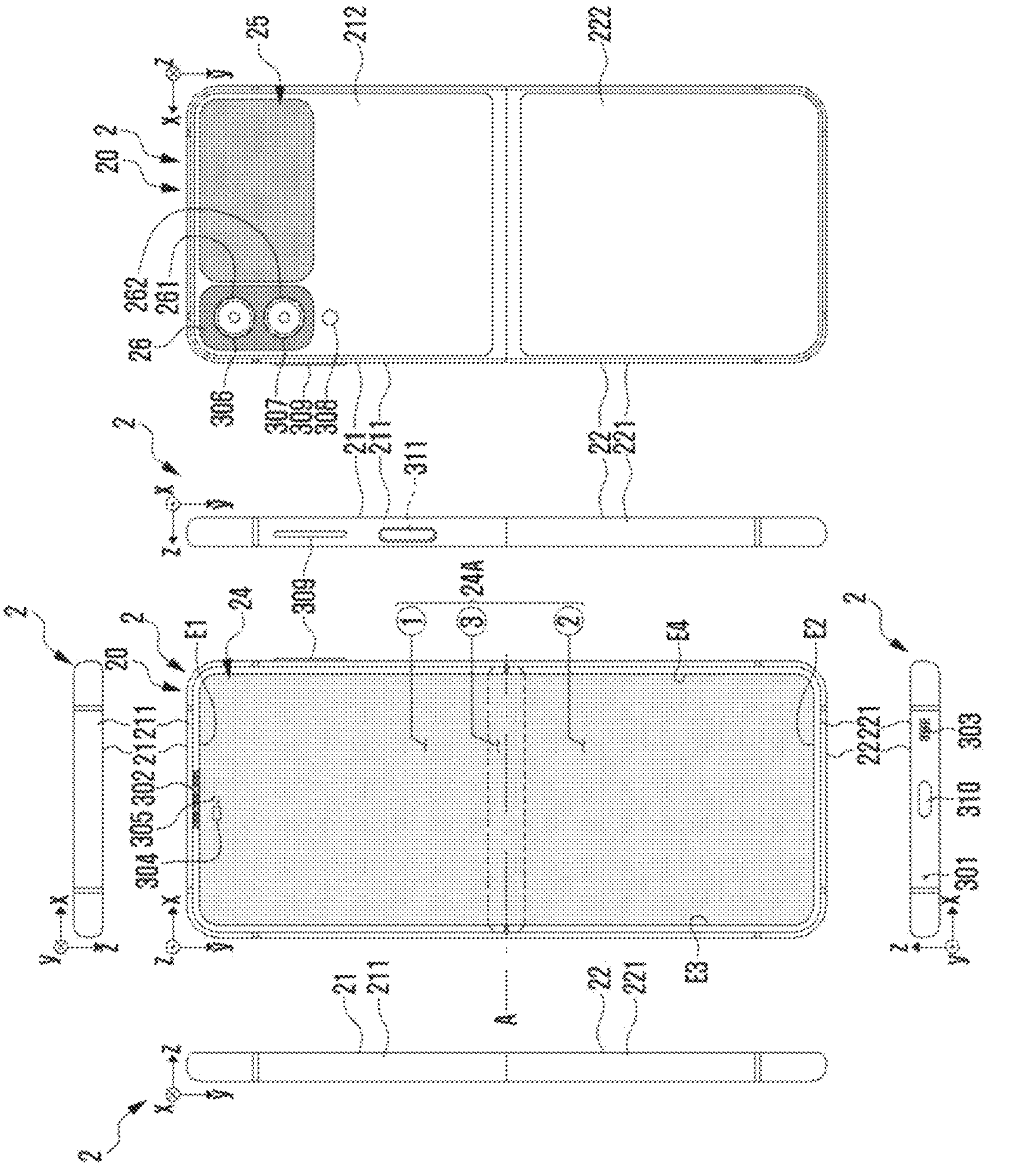
FIG. 2 shows multiple views illustrating a foldable electronic device in an unfolded state according to an embodiment of the disclosure.
Figure 3:
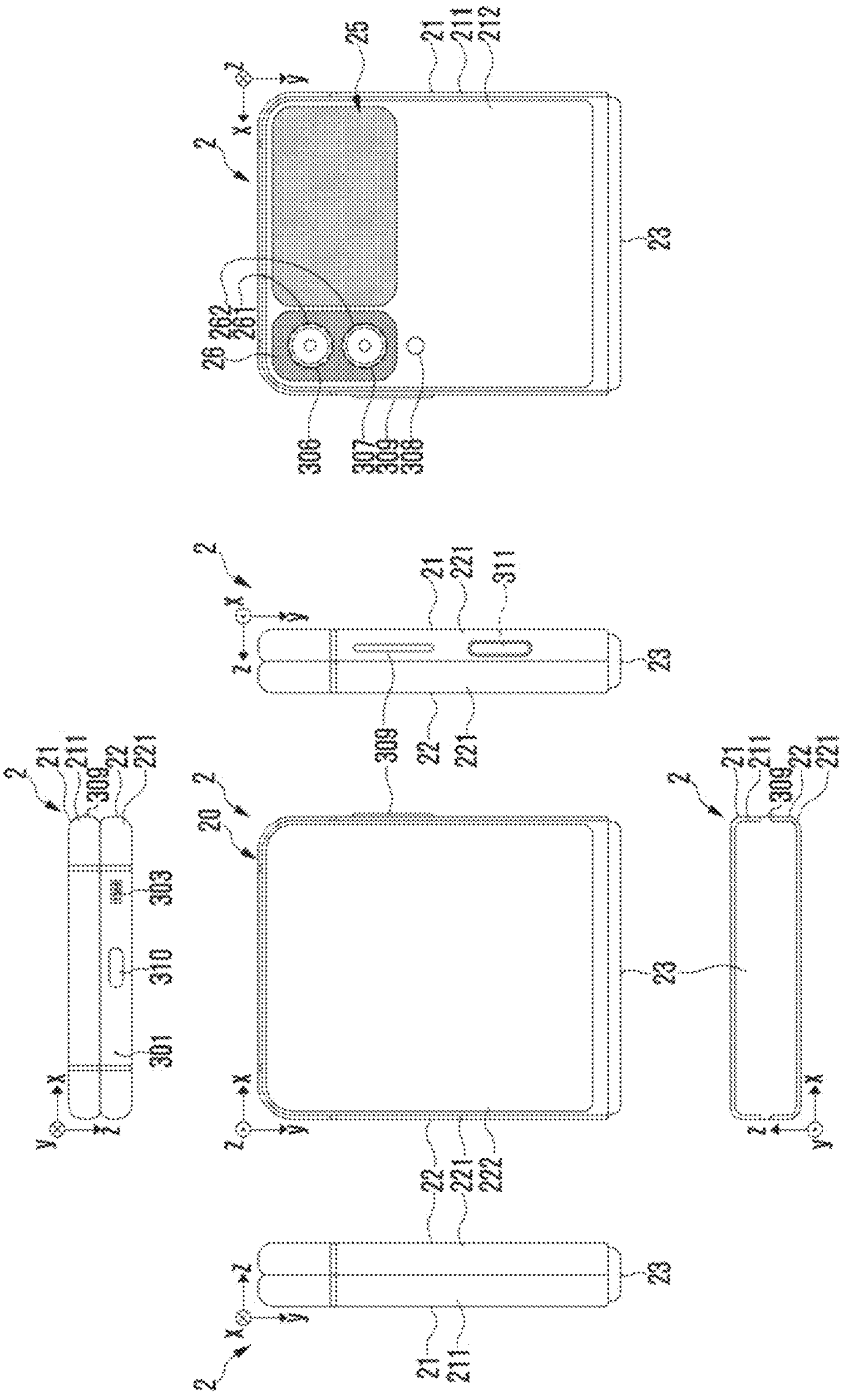
FIG. 3 shows multiple views illustrating a foldable electronic device in a folded state according to an embodiment of the disclosure.

FIG. 2 shows views illustrating a foldable electronic device 2 in an unfolded state (also referred to herein as an unfolding state or a flat state) according to an embodiment of the disclosure. FIG. 3 shows views illustrating the foldable electronic device 2 in a folded state (also referred to herein as a folding state) according to an embodiment of the disclosure.

With reference to FIGS. 2 and 3, the foldable electronic device 2 may include a foldable housing 20, a first display module 24 (e.g., a flexible display module or foldable display module), and/or a second display module 25 (also referred to herein as a second display). In various embodiments, the foldable electronic device 2 may be the electronic device 101 in FIG. 1.

According to an embodiment, the foldable housing 20 may include a first housing 21 (also referred to herein as a first housing part or first housing structure), a second housing 22 (also referred to herein as a second housing unit or second housing structure), a hinge housing 23, and/or a hinge section. The first housing 21 and the second housing 22 may be connected through the hinge section and mutually rotatable with respect to the hinge section. The hinge section may include one or more hinge modules (also referred to herein as hinge assemblies) (e.g., hinge module 430 in FIG. 4).

According to an embodiment, the display area 24A of the first display module 24 (also referred to herein as a first display), as an active area of the first display module 24 capable of displaying an image, may include a first display area ① (also referred to herein as a first active area or first screen area), a second display region ② (also referred to herein as a second active area or second screen area), and a third display area ③ (also referred to herein as a third active area or third screen area) extending the first display area ① and the second display area ②. The first display area ① may be positioned in correspondence to the first housing 21. The second display area ② may be positioned in correspondence to the second housing 22. The third display area ③ may be positioned in correspondence to the hinge section. The first display area ① may be disposed on the first housing 21, and the shape of the first display area ① may be maintained by the support of the first housing 21. The second display area ② may be disposed on the second housing 22, and the shape of the second display area ② may be maintained by the support of the second housing 22. The first display area ① and the second display area ② may be provided to be substantially flat, for example. The unfolded state (see FIG. 2) of the foldable electronic device 2 may be a state in which the third display area ③ is disposed to be substantially flat. In the unfolded state of the foldable electronic device 2, the first display area ① and the second display area ② may form an angle of about 180 degrees, and the display area 24A including the first display area ①, the second display area ②, and the third display area ③ may be provided (or disposed) in a substantially flat shape. In the unfolded state of the foldable electronic device 2, due to the relative position between the first display area ① disposed on the first housing 21 and the second display area ② disposed on the second housing 22, the third display area ③ connecting the first display area ① and the second display area ② may be disposed to be flat. In the unfolded state of the foldable electronic device 2, the third display area ③ may be pulled from both sides by the first display area ① and the second display area ②, this pulling force may be provided so as to reduce damage to the third display area ③ while disposing the third display area ③ to be flat. In the unfolded state of the foldable electronic device 2, the third display area ③ may be provided with an extended width so that it can be disposed to be flat while reducing stress by being pulled by the first display area ① and the second display area ②. In the unfolded state of the foldable electronic device 2, the hinge section may support the third display area ③. In the unfolded state of the foldable electronic device 2, when an external force (e.g., external pressure such as a touch input using a user's finger or a touch input using an electronic pen) is applied to the third display area (③), the hinge section may contribute to keeping the third display area ③ flat by reducing sagging of the third display area ③. When an external impact is applied due to a reason such as a drop in the unfolded state of the foldable electronic device 2, the hinge section may be configured to reduce the influence of the external impact on the third display area ③. The hinge section may support the third display area ③ so that the third display area ③ can be flatly arranged without sagging in the unfolded state of the foldable electronic device 2, thereby reducing a crease phenomenon. The illustrated coordinate axes are based on the first housing 21, and for example, the +z axis direction may be interpreted as a direction in which a plane provided by the flat first display area ① faces.

According to an embodiment, the foldable electronic device 2 may be provided in an infolding manner where the display area 24A of the first display module 24 is folded inward. In the foldable electronic device 2, the surface on which the display area 24A of the first display module 24 is visible may be interpreted as "the front surface of the foldable electronic device 2", and in the foldable electronic device 2, a surface facing in a direction opposite to the front surface of the foldable electronic device 2 may be interpreted as "the rear surface of the foldable electronic device 2". The foldable electronic device 2 may be configured such that the front surface or first display module 24 can be folded inward. FIG. 3 shows a fully folded state of the foldable electronic device 2 where the first housing 21 and the second housing 22 are disposed so that they are no longer closer to each other. In the fully folded state of the foldable electronic device 2, the first display area ① and the second display area ② may be positioned to face each other, and the third display area ③ may be disposed in a bent form. In the fully folded state of the foldable electronic device 2, the angle between the first housing 21 and the second housing 22 (or, the angle between the first display area ① and the second display area ②) may be about 0 to 10 degrees, and the display area 24A may be substantially invisible. An intermediate state of the foldable electronic device 2 may be a state between the unfolded state and the fully folded state, or a less folded state compared with the fully folded state. In an intermediate state where the angle between the first housing 21 and the second housing 22 is greater than or equal to a specific angle, a usage environment in which the user does not have significant difficulties in using the display area 24A can be provided. In the following description, the "folded state of the foldable electronic device 2" used in the disclosure may refer to the fully folded state in comparison to an intermediate state being a less folded state.

According to an embodiment, when viewed in the unfolded state of the foldable electronic device 2 (see FIG. 2), the display area 24A of the first display module 24 may be provided in a symmetrical form with respect to the center line A of the foldable electronic device 2. When viewed in the unfolded state of the foldable electronic device 2, the center line A may correspond to the middle of the width of the third display area ③ extended from a first boundary between the first display area ① and the third display area ③ to a second boundary between the second display area ② and the third display area ③. In the folded state of the foldable electronic device 2 (see FIG. 3), the third display area ③ disposed in a bent form may be substantially symmetrical with respect to the center line A of the foldable electronic device 2. When viewed in the unfolded state of the foldable electronic device 2, the display area 24A may have a substantially rectangular shape. The display area 24A may include a first edge E1, a second edge E2, a third edge E3, and a fourth edge E4. The first edge E1 and the second edge E2 may be substantially parallel to the center line A. The third edge E3 may connect one end of the first edge E1 and one end of the second edge E2, and the fourth edge E4 may connect the other end of the first edge E1 and the other end of the second edge E2. The first display area ① may include the first edge E1, a portion of the third edge E3, and a portion of the fourth edge E4. The second display area ② may include the second edge E2, a portion of the third edge E3, and a portion of the fourth edge E4. The third display area ③ may include a portion of the third edge E3 and a portion of the fourth edge E4. In the folded state of the foldable electronic device 2, the first edge E1 and the second edge E2 may be aligned in an overlapping manner. In the folded state of the foldable electronic device 2, a portion of the third edge E3 included in the first display area ① and a portion of the third edge E3 included in the second display area ② may be aligned in an overlapping manner. In the folded state of the foldable electronic device 2, a portion of the fourth edge E4 included in the first display area ① and a portion of the fourth edge E4 included in the second display area ② may be aligned in an overlapping manner.

According to an embodiment, the first housing 21 may include a first frame 211 (also referred to herein as a first frame structure or first framework) and/or a first cover 212 disposed on the first frame 211. The first frame 211 may include a first side (also referred to herein as a first side part, first lateral member, first lateral structure, or first lateral bezel structure) (e.g., first side 412 in FIG. 4). The first side may be disposed along the edge of the first display area ① of the first display module 24. The first side may provide a first side surface of the foldable electronic device 2 corresponding to the first display area ① of the foldable electronic device 2. The first frame 211 may include a first support (e.g., first support 411 in FIG. 4) extended from the first side or connected to the first side. The first display area ① may be disposed on the first support, and the first support may support the first display area ①. The first display area ① and the first cover 212 may be positioned on opposite sides of each other with the first support of the first frame 211 interposed therebetween. The first side of the first frame 211 may be disposed to at least partially surround a space between the first display area ① and the first cover 212. The first display area ① may provide one of the outer surfaces of the foldable electronic device 2, and the first cover 212 may provide the other one of the outer surfaces of the foldable electronic device 2 facing in a substantially opposite direction to the first display area ①. Various electrical components such as a printed circuit board or a battery may be disposed on the first support between the first support of the first frame 211 and the first cover 212.

According to an embodiment, the second housing 22 may include a second frame 221 (also referred to herein as a second frame structure or second framework) and/or a second cover 222 disposed on the second frame 221. The second frame 221 may include a second side (also referred to herein as a second side part, second lateral member, second lateral structure, or second lateral bezel structure) (e.g., second side 422 in FIG. 4). The second side may be disposed along the edge of the second display area ② of the first display module 24. The second side may provide a second side surface of the foldable electronic device 2 corresponding to the second display area ② of the foldable electronic device 2. In the folded state of the foldable electronic device 2 (see FIG. 3), the first side of the first frame 211 and the second side of the second frame 221 may be aligned in an overlapping manner. The second frame 221 may include a second support (e.g., second support 421 in FIG. 4) extended from the second side or connected to the second side. The second display area ② may be disposed on the second support, and the second support may support the second display area ②. The second display area ② and the second cover 222 may be positioned on opposite sides of each other with the second support of the second frame 221 interposed therebetween. The second side of the second frame 221 may be disposed to at least partially surround a space between the second display area ② and the second cover 222. The second display area ② may provide one of the outer surfaces of the foldable electronic device 2, and the second cover 222 may provide the other one of the outer surfaces of the foldable electronic device 2 facing in a substantially opposite direction to the second display area ②. Various electrical components (or, electronic components) such as a printed circuit board or a battery may be disposed on the second support between the second support of the second frame 221 and the second cover 222.

Figure 4:
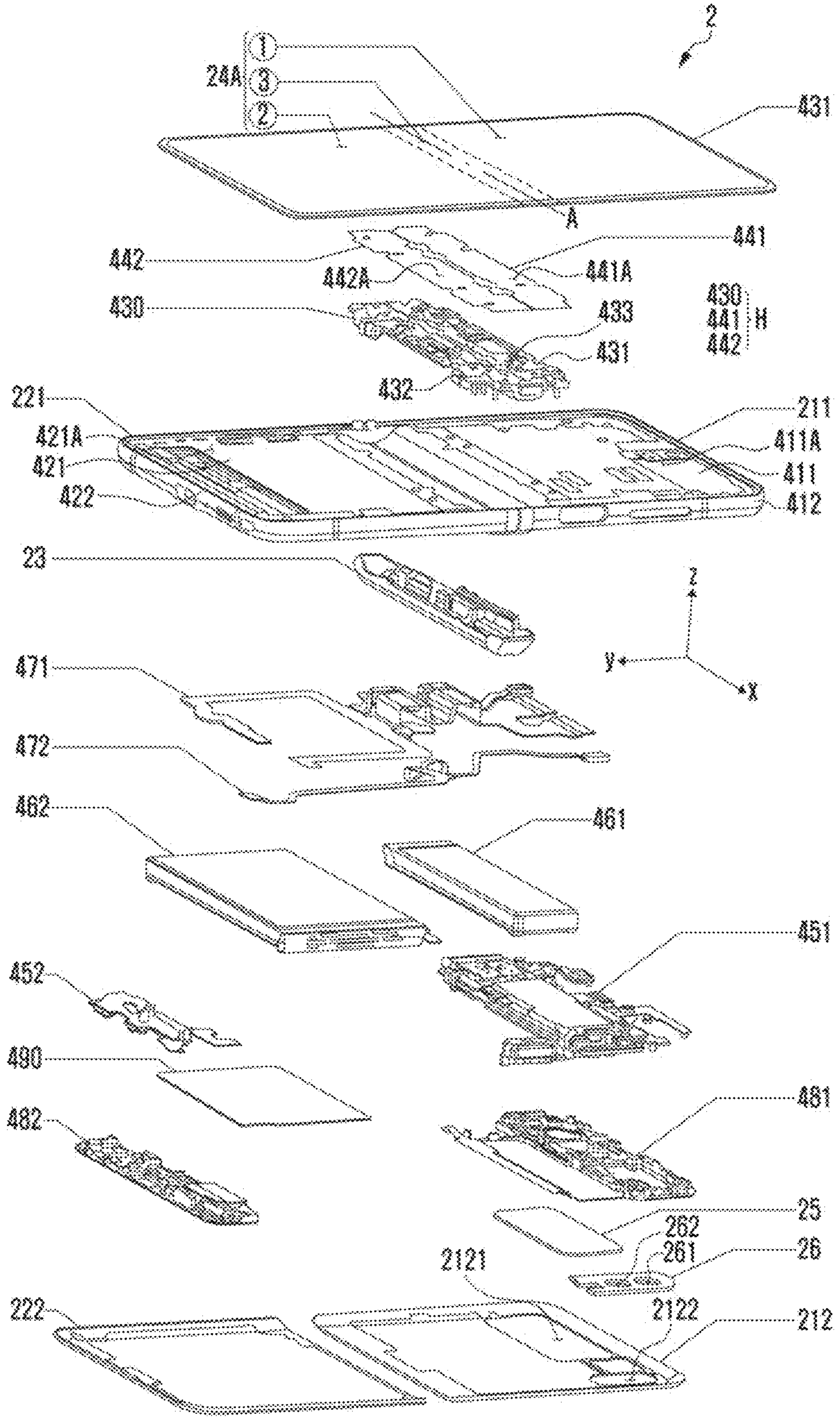
FIG. 4 is an exploded perspective view of a foldable electronic device in an unfolded state according to an embodiment of the disclosure.

According to an embodiment, the hinge housing 23 (also referred to herein as a hinge cover) may be coupled to a hinge module (e.g., hinge module 430 in FIG. 4). When the foldable electronic device 2 transitions from the unfolded state (see FIG. 2) to the folded state (see FIG. 3), due to a change in the relative position between the first housing 21 and the second housing 22 connected to each other through the hinge section and a change in the state of the hinge module coupled to the hinge housing 23, a gap between the first housing 21 and the second housing 22 may be opened on the opposite side of the third display area ③, and the hinge housing 23 may be exposed to the outside through the open gap. In the folded state of the foldable electronic device 2, the hinge housing 23 may be a part of the exterior covering the inside of the foldable electronic device 2 through the open gap between the first housing 21 and the second housing 22. The hinge housing 23 may be more exposed in the folded state of FIG. 3 than in the intermediate state. When the foldable electronic device 2 transitions from the folded state to the unfolded state, due to a change in the relative position between the first housing 21 and the second housing 22 connected to each other through the hinge section and a change in the state of the hinge module coupled to the hinge housing 23, the gap between the first housing 21 and the second housing 22 may be closed on the opposite side of the third display area ③, and the hinge housing 23 may be positioned in an internal space due to the combination of the first housing 21 and the second housing 22 and may be not exposed to the outside.

According to an embodiment, the second display module 25 may be disposed in a direction different from that of the first display module 24. The second display module 25 may provide a display area (or, screen area) facing in a direction opposite to the first display area ① of the first display module 24. The first cover 212 may include a first opening (e.g., first opening 2121 in FIG. 4), and the second display module 25 may be positioned in the first opening of the first cover 212. A part of the exterior of the foldable electronic device 2 may be provided by a transparent cover (for example, flexible transparent plate or a window covering and protecting the display) of the second display module 25. The foldable electronic device 2 may be configured to display an image through the second display module 25 instead of the first display module 24 in the folded state.

According to various embodiments, the first cover 212 or a region of the first cover 212 corresponding to the second display module 25 may be substantially transparent, and the second display module 25 may be seen through the second cover 222. In this case, the second display module 25 may be provided without a transparent cover (e.g., a flexible transparent plate covering and protecting the display, for example, a window), and may be coupled to the first cover 212 through an optically transparent adhesive material (e.g., optical clear adhesive (OCA), optical clear resin (OCR), or super view resin (SVR)).

According to an embodiment, the foldable electronic device 2 may include at least one of one or more audio modules (e.g., audio module 170 in FIG. 1), one or more sensor modules (e.g., sensor module 176 in FIG. 1), one or more camera modules (e.g., camera module 180 in FIG. 1), one or more light emitting modules, one or more input modules (e.g., input module 150 in FIG. 1), and/or one or more connection terminal modules (e.g., interface 177 or connection terminal 178 in FIG. 1). In various embodiments, the foldable electronic device 2 may be configured to omit at least one of the components or additionally include other components. The location or number of components included in the foldable electronic device 2 may vary without being limited to the illustrated example.

One of the one or more audio modules may include, for example, a microphone located inside the foldable electronic device 2 in correspondence to a microphone hole 301 provided on the exterior of the foldable electronic device 2. In the illustrated example, the microphone hole 301 may be provided on the second side of the second frame 221, and the microphone may be located in the internal space of the second housing 22. The location or number of microphones and microphone holes may vary without being limited to the illustrated example. In various embodiments, the foldable electronic device 2 may include a plurality of microphones used to detect the direction of a sound.

One of the one or more audio modules may include, for example, a first speaker for multimedia playback (or, recording playback) located inside the foldable electronic device 2 in correspondence to a first speaker hole 302 provided on the exterior of the foldable electronic device 2. In the illustrated example, the first speaker hole 302 may be provided on the first side of the first frame 211, and the first speaker may be located in the internal space of the first housing 21. The first speaker hole 302 may be provided on one surface of the first side of the first frame 211 toward which the first display area ① of the first display module 24 faces. One of the one or more audio modules may include, for example, a second speaker for a call (e.g., call receiver) located inside the foldable electronic device 2 in correspondence to the second speaker hole 303 (e.g., receiver hole) provided on the exterior of the foldable electronic device 2. In the illustrated example, the second speaker hole 303 may be provided on the second side of the second frame 221, and the second speaker may be located in the internal space of the second housing 22. The location or number of speakers and speaker holes may vary without being limited to the illustrated example. In various embodiments, a microphone hole and a speaker hole may be implemented as a single hole. In various embodiments, a piezo speaker may be provided without a speaker hole.

One or more sensor modules may generate, for example, electrical signals or data values corresponding to an internal operating state of the foldable electronic device 2 or an external environmental state. In an embodiment, one of the one or more sensor modules may include an optical sensor 304 located in the internal space of the first housing 21 in correspondence to the first display module 24. The optical sensor 304 may be positioned in alignment with an opening provided in the flexible display of the first display module 24 or be at least partially inserted into the opening. External light may reach the optical sensor through the transparent cover (e.g., a flexible transparent plate that covers and protects the flexible display, such as a window) of the first display module 24 and the opening of the flexible display. The optical sensor 304 may include, for example, a proximity sensor or an illuminance sensor. The number or location of optical sensors may vary without being limited to the illustrated example.

According to various embodiments, when viewed from above the first display area ① of the first display module 24, the optical sensor 304 may be positioned in the internal space of the first housing 21 while overlapping at least a portion of the first display area ①. In this case, the sensing function of the optical sensor 304 may be performed while the optical sensor 304 or the position thereof is not be visually distinguished (or exposed) or visible. In an embodiment, the optical sensor 304 may be located on the rear surface of the first display module 24 or below (or beneath) the first display module 24, and the optical sensor 304 or the position thereof may be not visually distinguished (or exposed). In various embodiments, the optical sensor 304 may be positioned in alignment with a recess provided on the rear surface of the first display module 24 or be at least partially inserted into the recess. A region of the first display module 24 overlapping at least partially with the optical sensor 304 may include a pixel structure and/or wiring structure different from that of other regions. For example, the region of the first display module 24 overlapping at least partially with the optical sensor 304 may have a pixel density (e.g., number of pixels per unit area) different from that of other regions. The pixel structure and/or wiring structure formed in the region of the first display module 24 overlapping at least partially with the optical sensor 304 may reduce loss of light between the outside and the optical sensor 304. For another example, a plurality of pixels may be not disposed in the region of the first display module 24 overlapping at least partially with the optical sensor 304.

According to various embodiments, without being limited to the optical sensor 304 such as a proximity sensor or illuminance sensor, various other sensors may be provided in correspondence to the first display module 24. For example, an optical, electrostatic, or ultrasonic biometric sensor (e.g., fingerprint sensor) may be positioned in correspondence to an opening provided in the flexible display of the first display module 24, or may be located on the rear surface of the first display module 24 or below the first display module 24.

According to various embodiments, various sensors such as an optical sensor may be located in the internal space of the first housing 21 in correspondence to the second display module 25. Various sensors such as an optical sensor may be positioned relative to the second display module 25 in a manner substantially the same as or similar to the manner in which the optical sensor 304 is positioned relative to the first display module 24.

According to various embodiments, the foldable electronic device 2 may include various other sensors (e.g., gesture sensor, gyro sensor, air pressure sensor, magnetic sensor, acceleration sensor, grip sensor, color sensor, IR (infrared) sensor, temperature sensor, or humidity sensor), and their locations may vary.

According to an embodiment, one or more camera modules may include one or plural lenses, an image sensor, and/or an image signal processor. The one or more camera modules may include, for example, a first camera module 305, a second camera module 306, and/or a third camera module 307.

According to an embodiment, the first camera module 305 may be located in the internal space of the first housing 21 in correspondence to the first display module 24. The first camera module 305 may be positioned in alignment with an opening provided in the flexible display of the first display module 24 or be at least partially inserted into the opening. External light may reach the first camera module 305 through the transparent cover (e.g., a flexible transparent plate that covers and protects the flexible display, for example, a window) of the first display module 24 and the opening of the flexible display. The opening provided in the flexible display of the first display module 24 aligned with or overlapping with the first camera module 305 may be provided in the form of a through hole as shown in the illustrated example. In various embodiments, the opening provided in the flexible display of the first display module 24 aligned with or overlapping with the first camera module 305 may be provided in a notch shape.

According to various embodiments, when viewed from above the first display area ① of the first display module 24, the first camera module 305 may be positioned in the internal space of the first housing 21 while overlapping with at least a portion of the first display area ①. In this case, the photographing function of the first camera module 305 may be performed while the first camera module 305 or the position thereof is not visually distinguished (or exposed) or visible. In an embodiment, the first camera module 305 may be located on the rear surface of the first display module 24 or below (or beneath) the first display module 24, and the first camera module 305 or the position thereof may be not visually distinguished (or exposed) or visible. In various embodiments, the first camera module 305 may be positioned in alignment with a recess provided on the rear surface of the first display module 24 or be at least partially inserted into the recess. The first camera module 305 may include, for example, a hidden under display camera (UDC). A region of the first display module 24 overlapping at least partially with the first camera module 305 may include a pixel structure and/or wiring structure different from that of other regions. For example, the region of the first display module 24 overlapping at least partially with the first camera module 305 may have a pixel density different from that of other regions. The pixel structure and/or wiring structure formed in the region of the first display module 24 overlapping at least partially with the first camera module 305 may reduce loss of light between the outside and the optical sensor. For another example, plural pixels may be not disposed in the region of the first display module 24 overlapping at least partially with the first camera module 305.

According to an embodiment, the foldable electronic device 2 may include a metal part 26 (or metal) (e.g., camera cover, camera decoration) provided in correspondence to the second camera module 306 or the third camera module 307. The metal part 26 may be located in a second opening (e.g., second opening 2122 in FIG. 4) provided in the first cover 212, and a part of the exterior of the foldable electronic device 2 may be provided by the metal part 26. The metal part 26 may include a first hole 261 provided in correspondence to the second camera module 306, and a second hole 262 provided in correspondence to the third camera module 307. The second camera module 306 may be exposed to the outside by being positioned in or inserted into the first hole 261 of the metal part 26. The third camera module 307 may be exposed to the outside by being positioned in or inserted into the second hole 262 of the metal part 26. The number or position of camera modules provided in correspondence to the metal part 26 may vary without being limited to the illustrated example. In an embodiment, the second camera module 306 and the third camera module 307 may have different attributes (e.g., angle of view) or functions. In an embodiment, the second camera module 306 and the third camera module 307 may provide different angles of view (or lenses with different angles of view), and the foldable electronic device 2 may selectively utilize the corresponding camera module based on the user's selection regarding the angle of view. For example, one of the second camera module 306 and the third camera module 307 may include wide-angle camera module, telephoto camera module, color camera module, monochrome camera module, or infrared (IR) camera module (e.g., time-of-flight (TOF) camera, structured light camera). In various embodiments, the IR camera module may operate as at least a part of the sensor module.

According to an embodiment, one of the one or more light emitting modules may include a flash 308 located in the internal space of the first housing 21 in correspondence to a flash hole (also referred to herein as a light transmission region) provided in the first cover 212. For example, the flash 308 may include a light source for the second camera module 306 and/or the third camera module 307. The flash 308 may include, for example, a light emitting diode (LED) or a xenon lamp.

According to various embodiments, one light emitting module (e.g., LED, IR LED, or xenon lamp) among the one or more light emitting modules may be configured to provide state information of the foldable electronic device 2 in the form of light. In various embodiments, the light emitting module may provide a light source linked with the operation of the first camera module 305.

According to an embodiment, the one or more input modules may include a key input device 309. In the illustrated example, the key input device 309 may be positioned in an opening provided in the first side of the first frame 211. The location or number of input modules may vary without being limited to the illustrated example. In various embodiments, the foldable electronic device 2 may not include the key input device 309, and may include, instead of the key input device 309, a soft key through the first display module 24 or the second display module 25. In various embodiments, the input modules may include at least one sensor module.

One of the one or more connection terminal modules (also referred to herein as connector modules or interface terminal modules) may include, for example, a connector (also referred to herein as an interface terminal) located inside the foldable electronic device 2 in correspondence to a connector hole 310 formed on the exterior of the foldable electronic device 2. In the illustrated example, the connector hole 310 may be provided on the second side of the second frame 221. The location or number of connection terminal modules may vary without being limited to the illustrated example. The foldable electronic device 2 may transmit and/or receive power and/or data to and from an external electronic device electrically connected to the connector. In an embodiment, the connector may include a USB connector or an HDMI connector. In various embodiments, one of the one or more connection terminal modules may include an audio connector (e.g., headphone connector or earset connector), and a connector hole provided on the exterior of the foldable electronic device 2 in correspondence to the audio connector. One of the one or more connection terminal modules may include a memory card connector located inside the foldable electronic device 2, and a connector hole formed on the exterior of the foldable electronic device 2 in correspondence to the memory card connector, where the connector hole may be covered with the cover 311.

According to various embodiments, the foldable electronic device 2 may include a detachable pen input gadget (e.g., electronic pen, digital pen, or stylus pen). The pen input gadget may be implemented to be inserted into the internal space of the first housing 21 or the second housing 22, for example. For another example, the pen input gadget may be attached to or detached from the hinge housing 23. The hinge housing 23 may include a recess, and the pen input gadget may fit into the recess.

The foldable electronic device 2 may further include various elements according to its provision form. Although possible variations according to the trend of digital convergence are too numerous to enumerate, the foldable electronic device 2 may further include an element comparable to the above-described components. In various embodiments, depending on the form of provision, a specific one of the above components may be excluded or replaced with another component.

FIG. 4 is an exploded perspective view of the foldable electronic device 2 in the unfolded state according to an embodiment of the disclosure.

With reference to FIG. 4, the foldable electronic device 2 may include a first frame 211, a first cover 212, a second frame 221, a second cover 222, a hinge cover 23, a first display module 24, a second display module 25, a hinge section H, a first printed circuit board 451, a second printed circuit board 452, a first battery 461, a second battery 462, a first flexible printed circuit board 471, a second flexible printed circuit board 472, a first inner support 481, a second inner support 482, an antenna structure 490, and/or a metal part 26.

According to an embodiment, the first housing 21 may include a first frame 211. In an embodiment, the first frame 211 may include a first support 411 and a first side 412. For example, the first frame 211 may be provided in an integral form including the first support 411 and the first side 412. The first support 411 is an internal structure located inside the foldable electronic device 2 in correspondence to the first housing 21, and may be referred to as various other terms such as "first bracket", "first support body", "first support member", or "first support structure".

According to an embodiment, the second housing 22 may include a second frame 221. In an embodiment, the second frame 221 may include a second support 421 and a second side 422. For example, the second frame 221 may be provided in an integral form including the second support 421 and the second side 422. The second support 421 is an internal structure located inside the foldable electronic device 2 in correspondence to the second housing 22, and may be referred to as various other terms such as "second bracket", "second support body", "second support member", or "second support structure".

According to an embodiment, at least a portion of the first frame 211 and/or at least a portion of the second frame 221 may be made of a metal material and/or a non-metal material (e.g., polymer). Electrical components (or electronic components) or various members related to electrical components may be disposed on the first frame 211 or first support 411 or be supported by the first frame 211 or first support 411. The first support 411 may include a first support region 411A facing toward the first display area ①, and a third support region (e.g., third support region 411B in FIGS. 5 and 6) facing in a substantially opposite direction to the first support region 411A. For example, the first display area ① of the first display module 24 may be disposed on the first support region 411A of the first support 411. Various components such as the first printed circuit board 451 or the first battery 461 may be disposed in the third support region. The second support 421 may include a second support region 421A facing toward the second display area ②, and a fourth support region facing in a substantially opposite direction to the second support region 421A. For example, the second display area ② of the first display module 24 may be disposed on the second support region 421A of the second support 421. Various components such as the second printed circuit board 452 or the second battery 462 may be disposed in the fourth support region. In an embodiment, the first display area ① may be disposed on the first support 411, and the second display area ② may be disposed on the second support 421 by use of various adhesive materials such as heat-reactive adhesive materials, photo-reactive adhesive materials, common adhesives, and/or double-sided tape.

According to an embodiment, the hinge section H may include a hinge module 430, a first plate (or, first wing plate) 441, and/or a second plate (or, second wing plate) 442.

According to an embodiment, the hinge module 430 may include a first bracket 431, a second bracket 432, and/or a bracket connection portion 433. For example, the first bracket 431 may be disposed on or coupled to the first support region 411A of the first frame 211 through screw fastening. For example, the second bracket 432 may be disposed on or coupled to the second support region 421A of the second frame 221 through screw fastening. The bracket connection portion 433 may connect the first bracket 431 and the second bracket 432. The first bracket 431 and the second bracket 432 may be rotatable with respect to the bracket connection portion 433.

According to an embodiment, the bracket connection portion 433 of the hinge module 430 may be formed such that the first frame 211 to which the first bracket 431 is fixed and the second frame 221 to which the second bracket 432 is fixed can be rotated at the same angle in opposite directions. The bracket connection portion 433 may be formed so that the first frame 211 to which the first bracket 431 is fixed and the second frame 221 to which the second bracket 432 is fixed can be rotated and maintained at least one specified angle. The bracket connection portion 433 may have, for example, a free-stop function. The bracket connection portion 433 may be formed to provide a force for mutual rotation of the first frame 211 to which the first bracket 431 is fixed and the second frame 221 to which the second bracket 432 is fixed. For example, the bracket connection portion 433 may be formed of a combination of at least one shaft, at least one cam gear, and/or at least one compression spring providing elasticity.

According to an embodiment, the first plate 441 may be positioned in correspondence to the first frame 211, and the second plate 442 may be positioned in correspondence to the second frame 221. In the first plate 441 and the second plate 442, a first width in a direction of the center line A of the foldable electronic device 2 (e.g., x-axis direction) may be relatively greater than a second width in a direction perpendicular to the above direction. The first plate 441 and the second plate 442 may overlap the hinge module 430. The first plate 441 and the second plate 442 may be coupled to the hinge module 430.

According to an embodiment, the first plate 441 and the second plate 442 may be connected to the bracket connection portion 433 of the hinge module 430. The first plate 441 may include a first surface 441A provided in correspondence to the third display area ③ of the first display module 24. The second plate 442 may include a second surface 442A provided in correspondence to the third display area ③ of the first display module 24. In the unfolded state of the foldable electronic device 2 (see FIG. 2), the first surface 441A of the first plate 441 may support a portion of the third display area ③, and the second surface 442A of the second plate 442 may support a portion of the third display area ③. The first surface 441A of the first plate 441 may include a flat surface capable of supporting one side of the third display area ③ with respect to the center line A of the foldable electronic device 2 in the unfolded state. The second surface 442A of the second plate 442 may include a flat surface capable of supporting the other side of the third display area ③ with respect to the center line A of the foldable electronic device 2 in the unfolded state. In the unfolded state of the foldable electronic device 2, the first surface 441A of the first plate 441 and the second surface 442A of the second plate 442 can substantially form an angle of about 180 degrees and can be arranged without a substantial height difference. In the unfolded state of the foldable electronic device 2, even if an external force (e.g., external pressure such as a touch input using a user's finger or a touch input using an electronic pen) is applied to the third display area ③, the third display area ③ can be maintained flat due to the support of the first plate 441 and the second plate 442.

According to an embodiment, the bracket connection portion 433 of the hinge module 430 may include a center plate aligned in correspondence to the center line A of the foldable electronic device 2. In the unfolded state of the foldable electronic device 2, the center plate may support some of the third display area ③ of the first display module 24 corresponding to between the first surface 441A of the first plate 441 and the second surface 442B of the second plate 442. In the unfolded state of the foldable electronic device 2, the center plate may reduce or prevent a sagging phenomenon or a crease phenomenon of some of the third display area ③ corresponding to the gap between the first surface 441A of the first plate 441 and the second surface 442A of the second plate 442.

According to an embodiment, when the foldable electronic device 2 is transitioned from the unfolded state (see FIG. 2) to the folded state (see FIG. 3), the hinge section H may be configured to provide a space in which the third display area ① of the first display module 24 can be arranged in a bent shape capable of reducing bending stress. When the foldable electronic device 2 is transitioned from the unfolded state to the folded state, the hinge section H may be configured to provide a space in which the third display area ③ can be arranged in a bent shape capable of reducing a buckling phenomenon. In an embodiment, when the foldable electronic device 2 is transitioned from the unfolded state to the folded state, the third display area ③ may be arranged in a droplet shape or dumbbell shape that can reduce damage or permanent deformation. In the folded state of the foldable electronic device 2, the third display area ③ may be arranged in a bent shape capable of reducing a collision (e.g., bending stress) between compressive stress generated in one region of the third display area ③ and tensile stress generated in one region of the third display area ③ with respect to the neutral plane inside the third display area ③.

According to an embodiment, the first flexible printed circuit board 471 and the second flexible printed circuit board 472 may be disposed across the hinge section H. The first flexible printed circuit board 471 and/or the second flexible printed circuit board 472 may electrically connect a first electrical element (e.g., first printed circuit board 451) located on the first frame 211 and a second electrical element (e.g., second printed circuit board 452) located on the second frame 221.

According to an embodiment, the first inner support 481 may be positioned between the first cover 212 and the first support 411 of the first frame 211. The first inner support 481 may be coupled to the first support 411 through screw fastening. The first inner support 481 may cover and protect components such as the first printed circuit board 451 or the first battery 461 disposed between the first support 411 and the first cover 212. In various embodiments, the first inner support 481 may include anon-metallic material, and a conductive pattern used as an antenna radiator may be disposed on or included in the first inner support 481. For example, the first frame 211 may be referred to as "first front case", and the first inner support 481 may be referred to as "first rear case".

According to an embodiment, the second inner support 482 may be positioned between the second cover 222 and the second support 421 of the second frame 221. The second inner support 482 may be coupled to the second support 421 through screw fastening. The second inner support 482 may cover and protect components such as the second printed circuit board 452 or the second battery 462 disposed between the second support 421 and the second cover 222. In various embodiments, the second inner support 482 may include a non-metallic material, and a conductive pattern used as an antenna radiator may be disposed on or included in the second inner support 482. For example, the second frame 221 may be referred to as "second front case", and the second inner support 482 may be referred to as "second rear case".

According to an embodiment, the antenna structure 490 may be positioned at least partially between the second support 421 of the second frame 221 and the second cover 222. For example, the antenna structure 490 may be implemented in the form of a film like a flexible printed circuit board. The antenna structure 490 may include at least one conductive pattern utilized as a loop-type radiator. For example, the at least one conductive pattern may include a planar spiral conductive pattern (e.g., planar coil, or pattern coil). The antenna structure 490 may be electrically connected to the first printed circuit board 451 through an electrical path such as a flexible printed circuit board. In an embodiment, the at least one conductive pattern included in the antenna structure 490 may be electrically connected to a communication circuit (e.g., wireless communication module 192 in FIG. 1) disposed on the first printed circuit board 451. For example, the at least one conductive pattern may be utilized for short-range wireless communication such as near field communication (NFC). As another example, the at least one conductive pattern may be used for magnetic secure transmission (MST) for transmitting and/or receiving a magnetic signal. In an embodiment, the at least one conductive pattern included in the antenna structure 490 may be electrically connected to a power transfer circuit disposed on the first printed circuit board 451. The power transfer circuit may utilize the at least one conductive pattern included in the antenna structure 490 to wirelessly receive power from an external electronic device or wirelessly transmit power to an external electronic device. The power transfer circuit may include a power management module, and may include, for example, a power management integrated circuit (PMIC) or a charger integrated circuit (IC). The power transfer circuit may charge the first battery 461 and/or the second battery 462 by using power wirelessly received through the conductive pattern.

According to an embodiment, the second display module 25 may be located at a first opening 2121 of the first cover 212. For example, the second display module 25 may be disposed on or coupled to the first inner support 481, and may be positioned at the first opening 2121 of the first cover 212 by being supported by the first inner support 481. In various embodiments, the second display module 25 may be coupled to the first cover 212.

According to an embodiment, the metal part 26 (e.g., camera cover or camera decoration) may be positioned at a second opening 2122 of the first cover 212. For example, the metal part 26 may include a first hole 261 at which the second camera module 306 (see FIG. 2) is positioned, and a second hole 262 at which the third camera module 307 (see FIG. 2) is positioned. For example, the metal part 26 may be disposed on or coupled to the first inner support 481 and may be positioned at the second opening 2122 by being supported by the first inner support 481. In various embodiments, the metal part 26 may be coupled to the first cover 212.

According to an embodiment, at least a portion of a conductive part included in the first frame 211 may be used as at least a part of an antenna radiator (also referred to herein as a radiation part). For example, at least a portion of a conductive part included in the first side 412 may operate as at least a part of an antenna radiator (or, radiation part) that transmits (or, radiates) an electromagnetic signal (or, electromagnetic wave) to the outside or receives an electromagnetic signal from the outside.

According to an embodiment, at least a portion of a conductive part included in the second frame 221 may be used as at least a part of an antenna radiator (or, radiation part). For example, at least a portion of a conductive part included in the second side 422 may operate as at least a part of an antenna radiator (or, radiation part) that transmits (or, radiates) an electromagnetic signal (or, electromagnetic wave) to the outside or receives an electromagnetic signal from the outside.

According to an embodiment, the metal part 26 may be used as at least a part of an antenna radiator (or, radiation part). For example, the metal part 26 may operate as at least a part of an antenna radiator (or, radiation part) that transmits (or, radiates) an electromagnetic signal (or, electromagnetic wave) to the outside or receives an electromagnetic signal from the outside.

According to an embodiment, the conductive pattern included in the second display module 25 may be used as at least a part of an antenna radiator (or, radiation part). The conductive pattern included in the second display module 25 may operate as at least a part of an antenna radiator (or, radiation part) that transmits (or, radiates) an electromagnetic signal (or, electromagnetic wave) to the outside or receives an electromagnetic signal from the outside.

Figure 5:
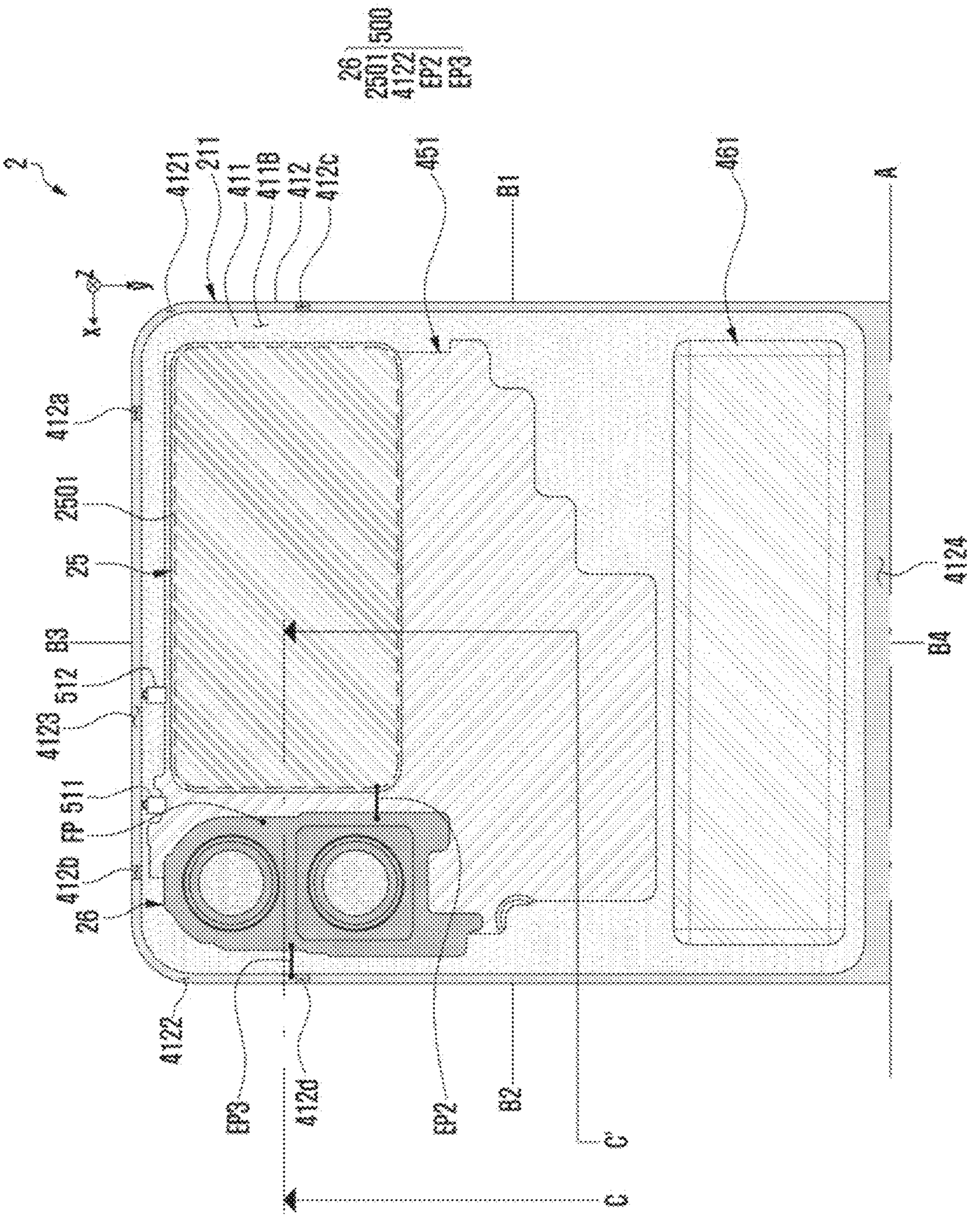
FIG. 5 is a view illustrating a part of a foldable electronic device according to an embodiment of the disclosure.
Figure 6:
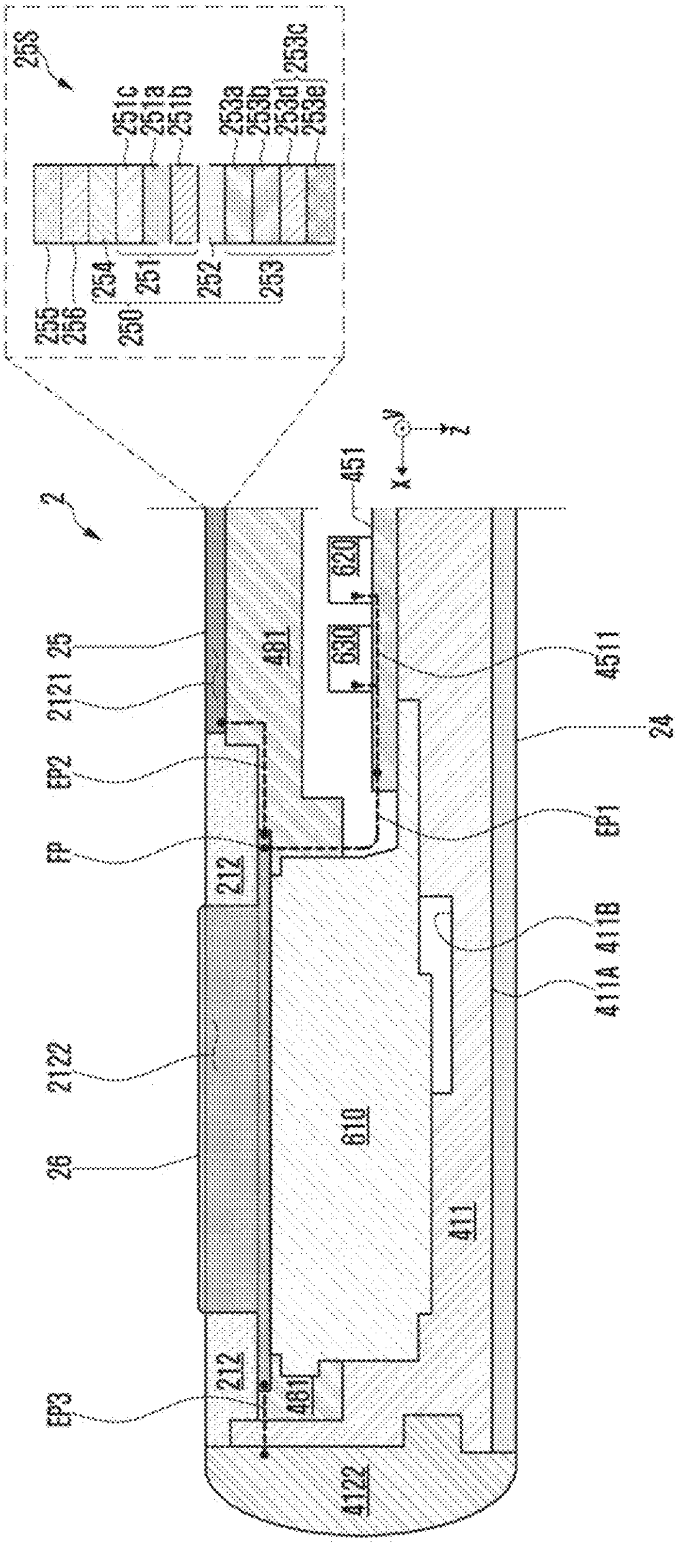
FIG. 6 is a cross-sectional view of the foldable electronic device taken along line C-C' in FIG. 5 according to an embodiment of the disclosure.

FIG. 5 is a view illustrating a part of a foldable electronic device 2 according to an embodiment of the disclosure. FIG. 6 is a cross-sectional view of the foldable electronic device 2 taken along line C-C' in FIG. 5 according to an embodiment of the disclosure.

With reference to FIGS. 5 and 6, the foldable electronic device 2 may include a first frame 211, a first display module 24, a second display module 25, a metal part 26, a first printed circuit board 451, a first battery 461, a camera assembly 610, a wireless communication circuit 620 (e.g., wireless communication module 192 in FIG. 1), and/or a matching circuit 630.

According to an embodiment, the first side 412 of the first frame 211 may include a first bezel B1, a second bezel B2, a third bezel B3, and/or a fourth bezel B4. The first bezel B1 and the second bezel B2 may be substantially perpendicular to the center line A of the foldable electronic device 2. The first bezel B1 and the second bezel B2 may be spaced apart from each other in a direction of the center line A of the foldable electronic device 2 (e.g., x-axis direction) and may be substantially parallel to each other. The third bezel B3 may connect one end of the first bezel B1 and one end of the second bezel B2, and may be substantially parallel to the center line A of the foldable electronic device 2. The fourth bezel B4 may connect the other end of the first bezel B1 and the other end of the second bezel B2, and may be substantially parallel to the third bezel B3. The fourth bezel B4 may be located closer to the center line A of the foldable electronic device 2 than the third bezel B3. For example, a first corner where the first bezel B1 and the third bezel B3 are connected and a second corner where the second bezel B2 and the third bezel B3 are connected may be provided in a round or curved shape. In the folded state of the foldable electronic device 2, the second side 422 (see FIG. 4) of the second frame 221 may be aligned with the first side 412 of the first frame 211 in an overlapping manner. In an embodiment, in the folded state (see FIG. 3) of the foldable electronic device 2, the second side 422 (see FIG. 4) of the second frame 221 may include, for example, a fifth bezel aligned with the first bezel B1 of the first side 412, a sixth bezel aligned with the second bezel B2 of the first side 412, a seventh bezel aligned with the third bezel B3 of the first side 412, and an eighth bezel aligned with the fourth bezel B4 of the first side 412. In the folded state of the foldable electronic device 2, due to a change in relative position between the first frame 211 and the second frame 221 (see FIG. 4) connected to each other through the hinge section H (see FIG. 4) and a state change of the hinge module 430 (see FIG. 4) coupled with the hinge housing 23, a gap between the fourth bezel B4 of the first side 412 and the eighth bezel of the second side 422 (see FIG. 4) is open on the opposite side of the third display area ③ (see FIG. 4), and the hinge housing 23 may be exposed to the outside through the open gap. When the foldable electronic device 2 is transitioned from the folded state to the unfolded state, due to a change in relative position between the first frame 211 and the second frame 221 (see FIG. 4) connected to each other through the hinge section H (see FIG. 4) and a state change of the hinge module 430 (see FIG. 4) coupled with the hinge housing 23, the gap between the fourth bezel B4 of the first side 412 and the eighth bezel of the second side 422 (see FIG. 4) is closed on the opposite side of the third display area ③ (see FIG. 4), and the hinge housing 23 may be located in an internal space formed by a combination of the first frame 211 and the second frame 221 (see FIG. 4) and may be not exposed to the outside.

According to an embodiment, the first side 412 of the first frame 211 may include a first conductive part 4121, a second conductive part 4122, a third conductive part 4123, a fourth conductive part 4124, a first insulating portion, a second insulating portion, a third insulating portion, and/or a fourth insulating portion. For example, the first conductive part 4121 may include the first corner where the first bezel B1 and the third bezel B3 are connected, a portion of the first bezel B1 extended from the first corner, and a portion of the third bezel B3 extended from the first corner. For example, the second conductive part 4122 may include the second corner where the second bezel B2 and the third bezel B3 are connected, a portion of the second bezel B2 extended from the second corner, and a portion of the third bezel B3 extended from the second corner. For example, the third conductive part 4123 may include a portion of the third bezel B3. For example, the fourth conductive part 4124 may include the fourth bezel B4, a portion of the first bezel B1 extended from one end of the fourth bezel B4, and a portion of the second bezel B2 extended from the other end of the fourth bezel B4. The first side 412 of the first frame 211 may include a first cut-off portion 412*a* between the first conductive part 4121 and the third conductive part 4123, and the first insulating portion may be disposed at the first cut-off portion 412*a*. The first side 412 of the first frame 211 may include a second cut-off portion 412*b* between the second conductive part 4122 and the third conductive part 4123, and the second insulating portion may be disposed at the second cut-off portion 412*b*. The first side 412 of the first frame 211 may include a third cut-off portion 412*c* between the first conductive part 4121 and the fourth conductive part 4124, and the third insulating portion may be disposed at the third cut-off portion 412*c*. The first side 412 of the first frame 211 may include a fourth cut-off portion 412*d* between the second conductive part 4122 and the fourth conductive part 4124, and the fourth insulating portion may be disposed at the fourth cut-off portion 412*d*. Together with the first conductive part 4121, second conductive part 4122, third conductive part 4123, and fourth conductive part 4124, the first insulating portion, second insulating portion, third insulating portion, and fourth insulating portion may constitute the external appearance of the foldable electronic device 2. In various embodiments, the number, position, or shape of plural conductive parts included in the first side 412 of the first frame 211 and plural insulating portions provided in correspondence to the plural conductive parts may vary without being limited to the illustrated example.

According to an embodiment, the first conductive part 4121, the second conductive part 4122, the third conductive part 4123, and/or the fourth conductive part 4124 may be connected to a conductive region (also referred to herein as a conductive part) included in the first support 411 of the first frame 211. The first conductive part 4121, the second conductive part 4122, the third conductive part 4123, and/or the fourth conductive part 4124 may include the same metal material as the conductive region included in the first support 411 of the first frame 211. The first frame 211 may include an integral conductive structure (e.g., a metal structure) including, for example, the first conductive part 4121, the second conductive part 4122, the third conductive part 4123, the fourth conductive part 4124, and the conductive region included in the first support 411. The second frame 221 (see FIG. 4) may be implemented in substantially the same or similar manner as the first frame 211.

According to an embodiment, the first insulating portion disposed at the first cut-off portion 412*a*, the second insulating portion disposed at the second cut-off portion 412*b*, the third insulating portion disposed at the third cut-off portion 412*c*, and/or the fourth insulating portion disposed at the fourth cut-off portion 412*d* may be connected to a non-conductive part (or, non-conductive region) included in the first support 411 of the first frame 211. The first insulating portion, the second insulating portion, the third insulating portion, and/or the fourth insulating portion may include, for example, the same non-conductive material (e.g., polymer) as the non-conductive part included in the first support 411.

According to an embodiment, at least one conductive part (e.g., first conductive part 4121, second conductive part 4122, third conductive part 4123, or fourth conductive part 4124) included in the first side 412 of the first frame 211 may be used as at least a part of an antenna radiator or radiation part that transmits an electromagnetic wave (or, electromagnetic signal) to the outside or receives an electromagnetic wave from the outside.

According to an embodiment, the foldable electronic device 2 may include a first flexible conductive part 511 (or, flexible conductive member) and/or a second flexible conductive part 512 disposed on the first printed circuit board 451. The first flexible conductive part 511 and the second flexible conductive part 512 may be in elastic contact with the third conductive part 4123 included in the first side 412 of the first frame 211. The first flexible conductive part 511 or the second flexible conductive part 512 may be a conductive clip (e.g., conductive structure having elasticity) as in the illustrated example, but may include, without being limited thereto, various elements such as pogo-pin, spring, conductive poron, conductive rubber, conductive tape, or conductive connector. For example, the third conductive part 4123 may be electrically connected to the wireless communication circuit 620 disposed on the first printed circuit board 451 through the first flexible conductive part 511. For example, the third conductive part 4123 may be electrically connected to a ground plane (or ground region) included in the first printed circuit board 451 through the second flexible conductive part 512. For example, a position or portion of the third conductive part 4123 electrically connected to the first flexible conductive part 511 may be a feeding point (also referred to herein as a feeder), and a position or portion of the third conductive part 4123 electrically connected to the second flexible conductive part 512 may be a grounding point. When the wireless communication circuit 620 supplies (or, feeds) a radiation current to the feeding point, a signal path may be formed between the feeding point and the grounding point. The third conductive part 4123 may have an electrical length (e.g., length expressed in terms of wavelengths) corresponding to the signal path, and operate as an antenna radiator having a resonant frequency corresponding to the electrical length. When a radiation current is supplied (or, fed) from the wireless communication circuit 620, the third conductive part 4123 of the first frame 211 may operate as a radiation region (or, radiator) having a distribution of radiation current forming a radiation field (or, electromagnetic field). The location or number of feeding points for the third conductive part 4123 may vary without being limited to the illustrated example. The location or number of grounding points for the third conductive part 4123 may vary without being limited to the illustrated example. In various embodiments, other conductive parts included in the first side 412 (e.g., first conductive part 4121, second conductive part 4122, or fourth conductive part 4124) may be formed to operate as an antenna radiator in substantially the same or similar manner as the third conductive part 4123.

According to an embodiment, when viewed from above the first cover 212 (see FIG. 2) (e.g., viewed in positive z-axis direction), the second display module 25 may be positioned closer to the first bezel B1 of the first frame 211 than the metal part 26 (e.g., camera cover or camera decoration). When viewed from above the first cover 212 (see FIG. 2), the metal part 26 may be positioned closer to the second bezel B2 of the first frame 211 than the second display module 25. For example, when viewed from above the first cover 212 (see FIG. 2), the second display module 25 and the metal part 26 may be positioned closer to the third bezel B3 of the first frame 211 than the first battery 461. For example, when viewed from above the first cover 212 (see FIG. 2), the second display module 25, the metal part 26, and the first battery 461 may not substantially overlap. For example, when viewed from above the first cover 212 (see FIG. 2), the first printed circuit board 451 may overlap the metal part 26 and/or the second display module 25 and may not overlap the first battery 461. For example, a part of the first printed circuit board 451 may be positioned between the second display module 25 and the first support 411 of the first frame 211. For example, a part of the first printed circuit board 451 may be positioned between the metal part 26 and the first support 411 of the first frame 211.

According to an embodiment, the metal part 26 (e.g., camera cover or camera decoration) may be positioned at the second opening 2122 of the first cover 212. For example, the metal part 26 may be supported by the first inner support 481 or the first support 411 of the first frame 211, and may be disposed on or coupled to the first inner support 481 or the first support 411. In an embodiment, the camera assembly 610 may include a second camera module 306 and/or a third camera module 307 (see FIG. 2). The camera assembly 610 may include, for example, a camera bracket connecting the second camera module 306 and the third camera module 307 to the first inner support 481 or the first support 411, and the second camera module 306 and the third camera module 307 may be disposed on or coupled to the camera bracket.

According to an embodiment, the metal part 26 (e.g., camera cover or camera decoration) may be used as at least a part of an antenna radiator or radiation unit. For example, the metal part 26 may be electrically connected to the first printed circuit board 451 through a first electrical path EP1 (or, first conductive path, first electrical connection portion). The first electrical path EP1 may be, for example, a flexible conductive part (or, flexible conductive member) disposed on the first printed circuit board 451 or the metal part 26 between the first printed circuit board 451 and the metal part 26. The conductive part may be of various types such as a conductive clip (e.g., conductive structure having elasticity), pogo-pin, spring, conductive poron, conductive rubber, conductive tape, or conductive connector. The metal part 26 may be electrically connected to the wireless communication circuit 620 disposed on the first printed circuit board 451 through the first electrical path EP1. A position or portion of the metal part 26 electrically connected to the first electrical path EP1 may be a feeding point (or, feeder) FP. The metal part 26 may receive a radiation current from the wireless communication circuit 620 through the feeding point FP. The first electrical path EP1 and the electrical path 4511 (e.g., signal line, conductive line, or conductive pattern) of the first printed circuit board 451 electrically connecting the first electrical path EP1 and the wireless communication circuit 620 may be a transmission line. The transmission line may electrically connect the wireless communication circuit 620 and the metal part 26 to transfer a radio frequency (RF) signal (i.e., voltage and current).

According to an embodiment, since the metal part 26 is arranged to provide a part of the exterior of the foldable electronic device 2, compared to an antenna radiator located in the internal space of the foldable electronic device 2, the metal part 26 may be relatively advantageous in securing antenna radiation performance (or radio transmission/reception performance) when transmitting electromagnetic waves to the outside or receiving electromagnetic waves from the outside. As the metal part 26 is exposed to the outside regardless of the unfolded state (see FIG. 2) or folded state (see FIG. 3) of the foldable electronic device 2, it may be relatively advantageous in securing antenna radiation performance, compared to an antenna radiator located in the internal space of the foldable electronic device 2.

According to an embodiment, the second display module 25 may be positioned at the first opening 2121 of the first cover 212. For example, the second display module 25 may be supported by the first inner support 481 or be disposed on or coupled to the first inner support 481.

According to an embodiment, referring to a cross-sectional view 25S of the second display module 25, the second display module 25 may include a display 250, a transparent cover 255, and/or an optical transparent adhesive 256. For example, the display 250 may be coupled to the transparent cover 255 through the optical transparent adhesive 256 (e.g., optical clear adhesive (OCA), optical clear resin (OCR), or super view resin (SVR)). The transparent cover 255 (e.g., a window) may cover the display 250 to protect the display 250 from the outside. The transparent cover 255 may constitute the rear surface of the foldable electronic device 2. The transparent cover 255 may include, for example, a polymer or glass. In various embodiments, the transparent cover 255 may include multiple layers. For example, the transparent cover 255 may have a form in which various coating layers are disposed on a plastic plate or glass plate. The transparent cover 255 may have a form in which at least one protective layer or coating layer containing, for example, a polymeric material (e.g., polyester (PET), polyimide (PI), thermoplastic polyurethane (TPU)) is disposed on a plastic plate or thin film plate. In various embodiments, the transparent cover 255 and the optical transparent adhesive 256 may be defined or interpreted as a part of the display 250. In various embodiments, the transparent cover 255 may be interpreted as a part of the foldable housing 20 (see FIG. 2) rather than the second display module 25. The display 250 may include, for example, a display panel 251, a base film 252, a lower panel 253, and/or an optical layer 254. The display panel 251 may be positioned between the optical layer 254 and the base film 252. The base film 252 may be positioned between the display panel 251 and the lower panel 253. The optical layer 254 may be positioned between the optical transparent adhesive 256 and the display panel 251. An adhesive material (or, adhesive member) of various polymers may be disposed between the display panel 251 and the base film 252, between the base film 252 and the lower panel 253, and/or between the display panel 251 and the optical layer 254. The display panel 251 may include, for example, a light emitting layer 251*a*, a thin film transistor (TFT) film 251*b* (or, TFT substrate), and/or an encapsulation layer 251*c* (e.g., thin-film encapsulation (TFE)). The light emitting layer 251*a* may include, for example, a plurality of pixels implemented with light emitting elements such as organic light emitting diodes (OLEDs) or micro LEDs. The light emitting layer 251*a* may be disposed on the TFT film 251*b* through organic evaporation. The TFT film 251*b* may be positioned between the light emitting layer 251*a* and the base film 252. The TFT film 251*b* may refer to a film structure in which at least one TFT is arranged on a flexible substrate (e.g., PI film) through a series of processes such as deposition, patterning, and/or etching. At least one TFT may control the current to the light emitting elements of the light emitting layer 251*a* to turn on or off the pixel or adjust the brightness of the pixel. The at least one TFT may be implemented with, for example, an amorphous silicon (a-Si) TFT, a liquid crystalline polymer (LCP) TFT, a low-temperature polycrystalline oxide (LTPO) TFT, or a low-temperature polycrystalline silicon (LTPS) TFT. In an embodiment, the display panel 251 may include a storage capacitor, and the storage capacitor can maintain a voltage signal to the pixel, maintain the voltage applied to the pixel within one frame, or reduce a change in gate voltage of the TFT due to a leakage current during emission time. By a routine (e.g., initialization, data write) for controlling at least one TFT, the storage capacitor may maintain the voltage applied to the pixel at regular time intervals. In an embodiment, the display panel 251 may be implemented based on OLEDs, and the encapsulation layer 251*c* may cover the light emitting layer 251*a*. Since organic materials and electrodes that emit light in OLEDs may react very sensitively to oxygen and/or moisture to lose their emission properties, to reduce or prevent this, the encapsulation layer 251*c* may seal the light emitting layer 251*a* so that oxygen and/or moisture does not permeate into the OLEDs. The base film 252 may serve to support and protect the display panel 251. In various embodiments, the base film 252 may be referred to as "protective film", "back film", or "back plate". The lower panel 253 may include a plurality of layers for various functions. An adhesive material of various polymers may be disposed between the plural layers included in the lower panel 253. In an embodiment, the lower panel 253 may include, for example, a light blocking layer 253*a*, a buffer layer 253*b*, and/or a lower layer 253*c*. The light blocking layer 253*a* may be positioned between the base film 252 and the buffer layer 253*b*. The buffer layer 253*b* may be positioned between the light blocking layer 253*a* and the lower layer 253*c*. The light blocking layer 253*a* may block at least a portion of light incident from the outside. For example, the light blocking layer 253*a* may include an embossed layer. The embossed layer may be a black layer including a bumpy pattern. The buffer layer 253*b* may mitigate an external impact applied to the display 250. For example, the buffer layer 253*b* may include a sponge layer or a cushion layer. The lower layer 253*c* may diffuse, disperse, or dissipate heat generated from the foldable electronic device 2 or the display 250. The lower layer 253*c* may absorb or shield electromagnetic waves. The lower layer 253*c* may mitigate an external impact applied to the foldable electronic device 2 or the display 250. For example, the lower layer 253*c* may include a composite sheet 253*d* or a metal sheet 253*e*. In an embodiment, the composite sheet

253_d_ may be a sheet obtained by combining layers or sheets having different properties. For example, the composite sheet 253_d_ may include at least one of polyimide and graphite. The composite sheet 253_d_ may be replaced with a single sheet containing one material (e.g., polyimide or graphite). The composite sheet 253_d_ may be positioned between the buffer layer 253_b_ and the metal sheet 253_e_. The metal sheet 253_e_ may be, for example, a copper sheet. For example, the metal sheet 253_e_ may include various different metal materials. The metal sheet 253_e_ may reduce electromagnetic interference (EMI) with respect to the second display module 25 or the display 250. In a certain embodiment, at least a portion of the lower layer 253_c_ may be a conductive member (e.g., metal plate) and help reinforce the rigidity of the foldable electronic device 2, and it can be used for shielding ambient noise and dissipating heat emitted from a surrounding heat emitting component (e.g., display driving circuit such as a display drive integrated circuit (DDI)). The conductive member may include, for example, at least one of copper (Cu), aluminum (Al), stainless steel (SUS), or CLAD (e.g., laminated member in which SUS and Al are alternately disposed). The lower layer 253_c_ may include various layers for various other functions. In various embodiments, at least one additional polymer layer (e.g., layer including PI, PET or TPU) may be disposed on the rear surface of the display panel 251 in addition to the base film 252. In various embodiments, at least one of the plural layers included in the lower panel 253 (e.g., light blocking layer 253_a_, buffer layer 253_b_, composite sheet 253_d_, metal sheet 253_e_) may be omitted. In various embodiments, the arrangement order of the plural layers included in the lower panel 253 may be variously changed without being limited to the illustrated embodiment. The optical layer 254 may include, for example, a polarizing layer (or, polarizer) or a retardation layer (or retarder). The polarizing layer and the retardation layer can improve the outdoor visibility of the screen. The optical layer 254 may selectively transmit light that is generated from, for example, a light source of the display panel 251 and vibrates in a specific direction. In various embodiments, one layer in which the polarizing layer and the retardation layer are combined may be provided, and this layer may be interpreted as a "circular polarizing layer". The optical transparent adhesive 256 may be positioned between the transparent cover 255 and the optical layer 254. In various embodiments, the polarizing layer (or, circular polarizing layer) may be omitted, and a black pixel define layer (PDL) and/or a color filter may be provided in place of the polarizing layer in this case. In an embodiment, the foldable electronic device 2 may include a touch sensing circuit (e.g., touch sensor). The touch sensing circuit may be implemented with a transparent conductive layer (or, film) based on various conductive materials such as indium tin oxide (ITO). In an embodiment, the touch sensing circuit may be disposed between the transparent cover 255 and the optical layer 254 (e.g., add-on type). In various embodiments, the touch sensing circuit may be disposed between the optical layer 254 and the display panel 251 (e.g., on-cell type). In various embodiments, the display panel 251 may include a touch sensing circuit or a touch sensing function (e.g., in-cell type). In various embodiments, the display panel 251 may be based on OLEDs and may include an encapsulation layer 251_c_ disposed between the light emitting layer 251_a_ and the optical layer 254. The encapsulation layer 251_c_ may serve as a pixel protection layer for protecting multiple pixels of the light emitting layer 251_a_. Multiple layers included in the display panel 251 or the lower panel 253, their stacking structure or stacking order may be various. The display 250 may be implemented by omitting some of the components or adding other components according to its provision form or the convergence trend.

According to various embodiments, the second display module 25 may be a flexible display module. In this case, the display 250 may be a flexible display. The transparent cover 255 may be provided in the form of a thin film (e.g., thin film layer) having flexibility. The transparent cover 255 may include, for example, a plastic film (e.g., polyimide (PI) film) or thin glass (e.g., ultra-thin glass (UTG)). In various embodiments, the transparent cover 255 may include a plurality of layers. The transparent cover 255 may have, for example, a form in which various coating layers are disposed on a plastic film or thin glass. The transparent cover 255 may have, for example, a form in which at least one protective layer or coating layer containing a polymer material (e.g., polyester (PET), polyimide (PI), or thermoplastic polyurethane (TPU)) is disposed on a plastic film or thin glass. The base film 252 may include a flexible film made of a polymer such as polyimide or polyester (PET) or plastic. In an embodiment, the display 250 may include a conductive pattern such as a metal mesh (e.g., aluminum metal mesh) as a touch sensing circuit disposed in the encapsulation layer 251_c_ between the encapsulation layer 251_c_ and the optical layer 254. For example, in response to bending of the display 250, the metal mesh may have greater durability than a transparent conductive layer implemented with ITO. In various embodiments, the display 250 may further include a pressure sensor capable of measuring the intensity (pressure) of a touch. In an embodiment, the first display module 24 may include at least some of the components included in the flexible display module described above.

According to various embodiments, the first display module 24 may include a support sheet (also referred to herein as a support plate or support layer). The support sheet may be disposed on the rear surface of the flexible display (e.g., display 250 implemented as a flexible display). The rear surface of the flexible display may be a surface positioned on the opposite side of the surface through which light is emitted from a display panel including a plurality of pixels. The support sheet may be disposed on (e.g., attached to) the rear surface of the lower panel (e.g., lower panel 253) of the flexible display while covering at least a portion of the lower panel. The support sheet may be coupled to the lower panel through an adhesive material. The adhesive material between the flexible display and the support sheet may include, for example, a heat-reactive adhesive material, a photo-reactive adhesive material, a common adhesive, or a double-sided tape. For another example, the adhesive material may include various polymers such as triazine thiol, dithiopyrimitine, or silane-based compounds, or organic adhesive materials such as sealants. The support sheet may contribute to the durability (e.g., rigidity reinforcement) of the first display module 24. The support sheet may reduce the influence of load or stress that may occur when folding the foldable housing 20 (see FIG. 2) on the first display module 24 (or, flexible display). The support sheet may reduce or prevent damage of the first display module 24 caused by a force transferred when the foldable housing 20 is folded. In an embodiment, the support sheet may include a metal material. The support sheet may include, for example, stainless steel. The support sheet may include various other metal materials. In various embodiments, the support sheet may include engineering plastic.

According to an embodiment, the support sheet included in the first display module 24 may include a lattice structure overlapping at least partially with the third display area ③

(see FIG. 2) of the first display module 24. The lattice structure may include, for example, a plurality of openings (or, slits) provided in the support sheet. The lattice structure may refer to a pattern structure in which a plurality of openings are regularly arranged. The plural openings may be formed periodically, have substantially the same shape, and may be repeatedly arranged at regular intervals. The lattice structure can reduce a decrease in flexibility of the third display area Z. In various embodiments, the lattice structure including multiple openings may be referred as different terms such as "opening pattern", "hole pattern", or "lattice pattern". In various embodiments, the support sheet may include a recess pattern including plural recesses in place of the lattice structure. The recess pattern may refer to, for example, a pattern structure in which plural recesses in a grooved shape are regularly disposed provided on a first surface of the support sheet facing the lower panel of the flexible display or on a second surface positioned on the opposite side of the first surface of the support sheet. In various embodiments, the lattice structure or recess pattern may be expanded to a part of the support sheet corresponding to the first display area ① (see FIG. 2) and/or the second display area ② (see FIG. 2) of the first display module 24. In various embodiments, the support sheet including a lattice structure or a recess pattern, or a conductive member corresponding thereto, may be provided in a plurality of layers. In various embodiments, the support sheet can reduce electromagnetic interference (EMI) related to the flexible display. In various embodiments, the support sheet may diffuse or dissipate heat emitted from a heat emitting component (e.g., display drive circuit such as display drive integrated circuit (DDI) or a DDI chip). In various embodiments, the support sheet may be interpreted as a separate element from the first display module 24.

According to an embodiment, the conductive pattern 2501 included in the second display module 25 may be used as at least a part of an antenna radiator or a radiation part. The conductive pattern 2501 of the second display module 25 used as an antenna radiator or radiation part may be included in the lower panel 253 or the lower layer 253*c*. In an embodiment, the conductive pattern 2501 of the second display module 25 used as an antenna radiator or radiation part may be a metal sheet 253*e*. As the conductive pattern 2501 of the second display module 25 is located close to the exterior of the foldable electronic device 2, compared to an antenna radiator located in the internal space of the foldable electronic device 2, the conductive pattern 2501 may be relatively advantageous in securing antenna radiation performance (or, radio transmission/reception performance) when transmitting electromagnetic waves to the outside or receiving electromagnetic waves from the outside.

According to an embodiment, the conductive pattern 2501 (e.g., metal sheet 253*e*) included in the second display module 25 may be electrically connected to the metal part 26 through a second electrical path EP2 (or, second conductive path, second electrical connection part). In an embodiment, the metal part 26 may be electrically connected to the second conductive part 4122 included in the first side 412 of the first frame 211 through a third electrical path EP3 (or, third conductive path, third electrical connection part). In an embodiment, the conductive pattern 2501 of the second display module 25 and/or the second conductive part 4122 of the first side 412 may be an additional radiator for the metal part 26 including a feeding point FP. The wireless communications circuit 620 may be configured to transmit and/or receive a transmit signal or a receive signal in at least one selected or specified frequency band through a first antenna radiator 500 (or, radiation structure, radiation section, radiation region, radiation circuit) including the metal part 26, the conductive pattern 2501 of the second display module 25, the second conductive part 4122 of the first side 412, the second electrical path EP2, and/or the third electrical path EP3. For example, when the wireless communication circuit 620 supplies (or, feeds) a radiation current (or, electromagnetic signal, radio signal) through the first electrical path EP1, a portion of the radiation current may flow into the metal part 26, a portion of the radiation current may flow from the metal part 26 to the conductive pattern 2501 of the second display module 25 through the second electrical path EP2, and a portion of the radiation current may flow from the metal part 26 to the second conductive part 4122 of the first side 412 through the third electrical path EP3. When the wireless communication circuit 620 supplies a radiation current to the first electrical path EP1, due to the path through which the radiation current flows and/or the distribution of the radiation current in the first antenna radiator 500, a radiation field (or, electromagnetic field) capable of transmitting and/or receiving a signal having at least one frequency in at least one selected or specified frequency band may be formed. The metal part 26 may be interpreted as "first radiation unit" or "first radiation region" that provides a distribution of radiation current in the first antenna radiator 500. The conductive pattern 2501 of the second display module 25 may be interpreted as "second radiation unit" or "second radiation region" that provides a distribution of radiation current in the first antenna radiator 500. The second conductive part 4122 of the first side 412 may be interpreted as "third radiation unit" or "third radiation region" providing a distribution of radiation current in the first antenna radiator 500.

According to an embodiment, the frequency band for a transmission signal or a reception signal processed by the wireless communication circuit 620 through the first antenna radiator 500 may include at least one of low band (LB, about 600 MHz to about 1 GHz), middle band (MB, about 1 GHz to about 2.3 GHz), high band (HB, about 2.3 GHz to about 2.7 GHz), or ultra-high band (UHB, about 2.7 GHz to about 6 GHz). In addition, the frequency band may be varied.

According to an embodiment, the second electrical path EP2 may include a flexible conductive sheet (or, flexible conductive film) electrically connecting the conductive pattern 2501 of the second display module 25 and the metal part 26. Through a conductive adhesive material, one end of the conductive sheet may be electrically connected to the metal part 26, and the other end of the conductive sheet may be electrically connected to the conductive pattern 2501 of the second display module 25. In various embodiments, the second electrical path EP2 may be of various types such as a cable or a flexible printed circuit board.

According to various embodiments, the second electrical path EP2 may include a conductive line (also referred to herein as a signal line or conductive pattern) disposed on the first non-conductive inner support 481. One end of the conductive line may be electrically connected to the metal part 26, and the other end of the conductive line may be electrically connected to the conductive pattern 2501 of the second display module 25. One end of the conductive line and the metal part 26, and/or the other end of the conductive line and the conductive pattern 2501 of the second display module 25 may be electrically connected through a flexible conductive part (e.g., conductive clip, pogo pin, spring, conductive poron, conductive rubber, conductive tape, conductive connector) or a conductive adhesive part (e.g., conductive adhesive material).

According to various embodiments, the position on the metal part 26 electrically connected to the second electrical path EP2 or the position on the conductive pattern 2501 of the second display module 25 electrically connected to the second electrical path EP2 may be varied. For example, the position on the metal part 26 electrically connected to the second electrical path EP2 or the position on the conductive pattern 2501 of the second display module 25 electrically connected to the second electrical path EP2 may be determined based on the operating frequency band of an antenna utilizing the metal part 26 and the conductive pattern 2501 as a radiator. In an embodiment, the location or number of second electrical paths EP2 electrically connecting the metal part 25 and the conductive pattern 2501 of the second display module 25 may be varied.

According to an embodiment, the third electrical path EP3 may include various types of electrical connection parts electrically connecting the metal part 26 and the second conductive part 4122 of the first side 412. The electrical connection part may include, for example, a flexible conductive part (e.g., conductive clip, pogo pin, spring, conductive poron, conductive rubber, conductive tape, conductive connector). The electrical connection part may include, for example, a cable or a flexible printed circuit board. The electrical connection part may include, for example, a conductive pattern disposed at least partially on the first frame 211 or the first inner support 481.

According to various embodiments, the position on the metal part 26 electrically connected to the third electrical path EP3 or the position on the second conductive part 4122 of the first frame 211 electrically connected to the third electrical path EP3 may be varied. The position on the metal part 26 electrically connected to the third electrical path EP3 or the position on the second conductive part 4122 of the first frame 211 electrically connected to the third electrical path EP3 may be determined based on the operating frequency of an antenna utilizing the metal part 26 and the second conductive part 4122 as a radiator. In an embodiment, the location or number of third electrical paths EP3 electrically connecting the metal part 26 and the second conductive part 4122 of the first frame 211 may be varied.

According to an embodiment, some of the plural conductive parts (e.g., first conductive part 4121, second conductive part 4122, third conductive part 4123, fourth conductive part 4124) included in the first side 412 of the first frame 211 (e.g., second conductive part 4122) may be included in the first antenna radiator 500. In an embodiment, some other of the plural conductive parts included in the first side 412 (e.g., third conductive part 4123) may operate as a second antenna radiator. For example, the first antenna radiator 500 may be positioned or configured to have an isolation capable of securing antenna radiation performance (or, radio transmission/reception performance) with respect to the second antenna radiator (e.g., third conductive part 4123). In various embodiments, the foldable electronic device 2 may include various other second antenna radiators without being limited to the second antenna radiator including a conductive part included in the first side 412. The various other second antenna radiators may include, for example, a conductive pattern that is disposed on the first cover 212 (see FIG. 2) or the first inner support 481 or is included in the first cover 212 (see FIG. 2) or the first inner support 481. The first antenna radiator 500 may be positioned or configured to have a specified degree of isolation with respect to various other second antenna radiators.

According to an embodiment, the matching circuit 630 may be disposed on the first printed circuit board 451. The matching circuit 630 may be electrically connected to an electrical path 4511 that electrically connects the first electrical path EP1 of the first printed circuit board 451 and the wireless communication circuit 620. The matching circuit 630 may adjust resonance of the first antenna radiator 500. The matching circuit 630 may include a frequency adjustment circuit, and may shift the resonant frequency of the first antenna radiator 500 to a specified frequency or by a specified amount. The matching circuit 630 may reduce reflection (or, amount of reflection) at a selected or specified frequency (or, operating frequency, usage frequency) for the first antenna radiator 500. The matching circuit 630 may enable efficient signal transmission by reducing power loss through the first antenna radiator 500 at a selected or specified frequency. In an embodiment, the matching circuit 630 may have a component value capable of matching impedance between the wireless communication circuit 620 and the first antenna radiator 500. The matching circuit 630 may include, for example, one or more electrical elements (e.g., lumped element or passive element) having components such as capacitance, inductance or conductance, or a circuit implemented with a combination of these electrical elements.

According to an embodiment, the matching circuit 630 may allow the first antenna radiator 500 to have a specified degree of isolation with respect to at least one surrounding antenna radiator (e.g., second antenna radiator including the third conductive part 4123) so as to secure antenna radiation performance in a selected or specified frequency band while reducing interference from the at least one surrounding antenna radiator to the first antenna radiator 500.

According to various embodiments, the second electrical path EP2 may include a first partial electrical path, a second partial electrical path, and/or a third partial electrical path. For example, the first partial electrical path may electrically connect the second display module 25 and the first printed circuit board 451. The second partial electrical path may electrically connect the metal part 26 and the first printed circuit board 451. The third partial electrical path may electrically connect the first partial electrical path and the second partial electrical path. The third partial electrical path may be a conductive pattern (or, wiring) included in the first printed circuit board 451. In various embodiments, the foldable electronic device 2 may further include a matching circuit (e.g., matching circuit 630) disposed on the first printed circuit board 451. The matching circuit may be electrically connected to the third partial electrical path. The matching circuit may adjust resonance of the first antenna radiator 500. The matching circuit may include a frequency adjustment circuit, and may shift the resonant frequency of the first antenna radiator 500 to a specified frequency or by a specified amount. The matching circuit may reduce reflection at a selected or specified frequency (or, operating frequency, usage frequency) for the first antenna radiator 500. The matching circuit may enable efficient signal transmission by reducing power loss through the first antenna radiator 500 at a selected or specified frequency. The matching circuit may have a component value capable of matching impedance between the wireless communication circuit 620 and the first antenna radiator 500. The matching circuit may include, for example, one or more electrical elements (e.g., lumped element or passive element) having components such as capacitance, inductance or conductance, or a circuit implemented with a combination of these electrical elements. The matching circuit may allow the first antenna radiator 500 to have a specified degree of isolation with respect to at least one surrounding antenna radiator (e.g., second antenna radiator including the third conductive part 4123) so as to secure antenna radiation performance in a selected or specified frequency band while reducing interference from the at least one surrounding antenna radiator to the first antenna radiator 500.

According to various embodiments, the third electrical path EP3 may include a fourth partial electrical path, a fifth partial electrical path, and/or a sixth partial electrical path. The fourth partial electrical path may electrically connect the metal part 26 and the first printed circuit board 451. The fifth partial electrical path may electrically connect the second conductive part 4122 of the first frame 211 and the first printed circuit board 451. The sixth partial electrical path may electrically connect the fourth partial electrical path and the fifth partial electrical path. The sixth partial electrical path may be a conductive pattern (or wiring) included in the first printed circuit board 451. In various embodiments, the foldable electronic device 2 may further include a matching circuit (e.g., matching circuit 630) disposed on the first printed circuit board 451. The matching circuit may be electrically connected to the sixth partial electrical path. The matching circuit may adjust resonance of the first antenna radiator 500. The matching circuit may include a frequency adjustment circuit, and may shift the resonant frequency of the first antenna radiator 500 to a specified frequency or by a specified amount. The matching circuit may reduce reflection at a selected or specified frequency (or, operating frequency, usage frequency) for the first antenna radiator 500. The matching circuit may enable efficient signal transmission by reducing power loss through the first antenna radiator 500 at a selected or specified frequency. The matching circuit may have a component value capable of matching impedance between the wireless communication circuit 620 and the first antenna radiator 500. The matching circuit may include, for example, one or more electrical elements (e.g., lumped element or passive element) having components such as capacitance, inductance or conductance, or a circuit implemented with a combination of these electrical elements. The matching circuit may allow the first antenna radiator 500 to have a specified degree of isolation with respect to at least one surrounding antenna radiator (e.g., second antenna radiator including the third conductive part 4123) so as to secure antenna radiation performance in a selected or specified frequency band while reducing interference from the at least one surrounding antenna radiator to the first antenna radiator 500.

According to various embodiments, the first antenna radiator 500 may be provided without the third electrical path EP3 and the second conductive part 4122 (e.g., third radiation region) of the first side 412.

According to various embodiments, the shape or location of the plural conductive parts included in the first side 412 of the first frame 211 may be varied without being limited to the illustrated illustrative, and the first antenna radiator 500 may be formed to include at least some of the plural conductive parts included in the first side 412.

According to various embodiments, the first antenna radiator 500 may further include at least one other conductive part (e.g., first conductive part 4121) of the first side 412 of the first frame 211. For example, the first conductive part 4121 may be electrically connected to the conductive pattern 2501 of the second display module 25.

According to various embodiments, the first antenna radiator 500 may be changed or modified to include another metal part (or, conductive part, conductive pattern, conductive structure, conductive region) in place of the metal part 26 (e.g., first radiation region). The other metal part may include, for example, a conductive pattern disposed on the first cover 212 (see FIG. 2). For another example, the other metal part may be coupled to an electrical element (e.g., speaker module or sensor module) such as the metal part 26 corresponding to the camera assembly 610, and may be positioned at the opening of the first cover 212 (see FIG. 2) or be adjacent to the first cover 212 (see FIG. 2). In an embodiment, the other metal part 26 may be coupled to an electrical element such as the metal part 26 corresponding to the camera assembly 610, and may constitute a portion of the external appearance of the foldable electronic device 2.

According to various embodiments, the location or number of feeding points FP may be varied without being limited to the illustrated example. For example, a feeding point may be located on the conductive pattern 2501 of the second display module 25. For another example, a feeding point may be located at the second conductive part 4122.

According to an embodiment, a conductive region (or, conductive part) included in the first support 411 of the first frame 211 may be electrically connected to a ground plane included in the first printed circuit board 451. The conductive region included in the first support 411 of the first frame 211 may be electrically connected to the ground plane included in the first printed circuit board 451 through at least one flexible conductive part (e.g., conductive clip, pogo pin, spring, conductive poron, conductive rubber, conductive tape, conductive connector) or a conductive adhesive (e.g., conductive adhesive material) positioned between the first support 411 and the first printed circuit board 451. The conductive structure including the ground plane included in the first printed circuit board 451 and the conductive region included in the first support 411 of the first frame 211 may be interpreted as a ground structure (or, ground) of the foldable electronic device 2. The ground structure of the foldable electronic device 2 may serve as an antenna ground capable of securing antenna radiation performance, securing coverage, and/or reducing electromagnetic interference (EMI) (or, signal loss) with respect to a plurality of antenna radiators.

According to an embodiment, the first antenna radiator 500 may be electrically connected to the ground structure of the foldable electronic device 2. The flexible printed circuit board electrically connecting the first display module 24 and the first printed circuit board 451 may include an electrical path electrically connecting the conductive pattern 2501 of the second display module 25 and the ground plane of the first printed circuit board 451. In an embodiment, the ground region included in the camera assembly 610 may be electrically connected to the metal part 26, and the flexible printed circuit board electrically connecting the camera assembly 610 and the first printed circuit board 451 may include an electrical path electrically connecting the ground region of the camera assembly 610 and the ground plane of the first printed circuit board 451. A position or portion of the first antenna radiator 500 electrically connected to the ground structure of the foldable electronic device 2 may serve as a grounding point. In an embodiment, the grounding point of the first antenna radiator 500 may be included in the metal part 26, the conductive pattern 2501 of the second display module 25, or the second conductive part 4122 included in the first side 412 of the first frame 211. In various embodiments, the grounding point of the first antenna radiator 500 may be included in the second electrical path EP2 or the third electrical path EP3. The location or number of grounding points of the first antenna radiator 500 may be varied without being limited to the illustrated example.

According to an embodiment, when the wireless communication circuit 620 supplies a radiation current to the feeding point FP, the first antenna radiator 500 may establish a signal path between the feeding point FP and at least one grounding point. The first antenna radiator 500 may provide at least one electrical length (e.g., length expressed in terms of wavelengths) corresponding to the signal path, and may have at least one resonant frequency corresponding to the at least one electrical length. When a radiation current is supplied (or fed) from the wireless communication circuit 620 through the feeding point FP, due to the path through which the radiation current flows and/or the distribution of the radiation current in the first antenna radiator 500 based on the shape of the first antenna radiator 500, the feeding point FP, and at least one grounding point, a radiation field (or, electromagnetic field) capable of transmitting and/or receiving a signal having at least one frequency in at least one selected or specified frequency band may be formed.

According to an embodiment, the copper sheet (e.g., metal sheet 253*e*) included in the first display module 24 may be electrically connected to a conductive region included in the first support 411 of the first frame 211. The metal sheet (e.g., copper sheet) included in the first display module 24 may be electrically connected to the conductive region included in the first support 411 of the first frame 211 through at least one flexible conductive part (e.g., conductive clip, pogo pin, spring, conductive poron, conductive rubber, conductive tape, conductive connector) or a conductive adhesive (e.g., conductive adhesive material) positioned between the first support 411 and the first display module 24. The ground structure of the foldable electronic device 2 may further include a ground plane of the first display module 24. The ground structure of the foldable electronic device 2 may operate as an antenna ground that can secure antenna radiation performance, secure coverage, and/or reduce electromagnetic interference (EMI) (or, signal loss) for a plurality of antenna radiators.

Figure 7:
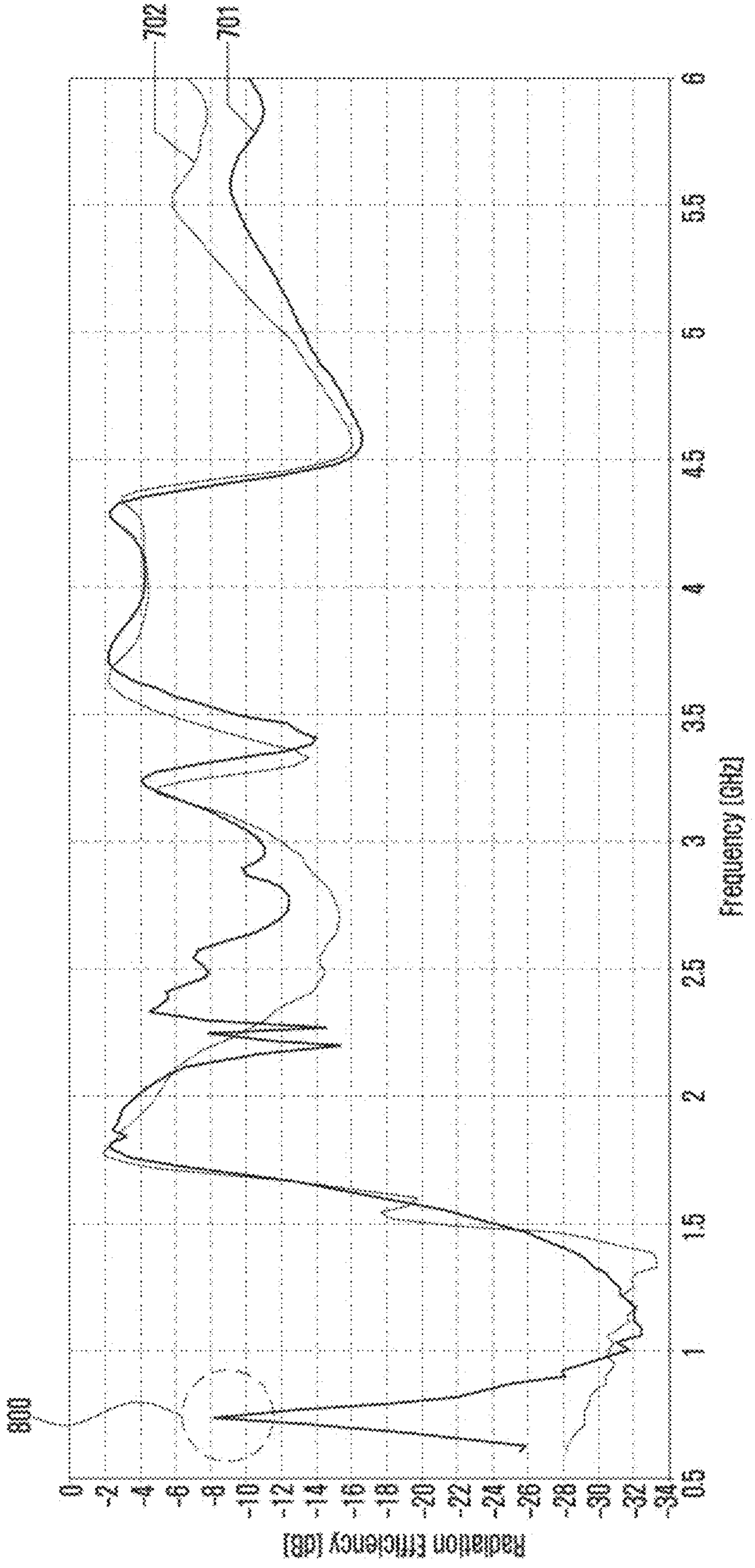
FIG. 7 shows a graph indicating antenna radiation performance of an antenna radiator according to an embodiment of the disclosure, and a graph indicating antenna radiation performance of an antenna radiator according to a comparison example.
Figure 8:
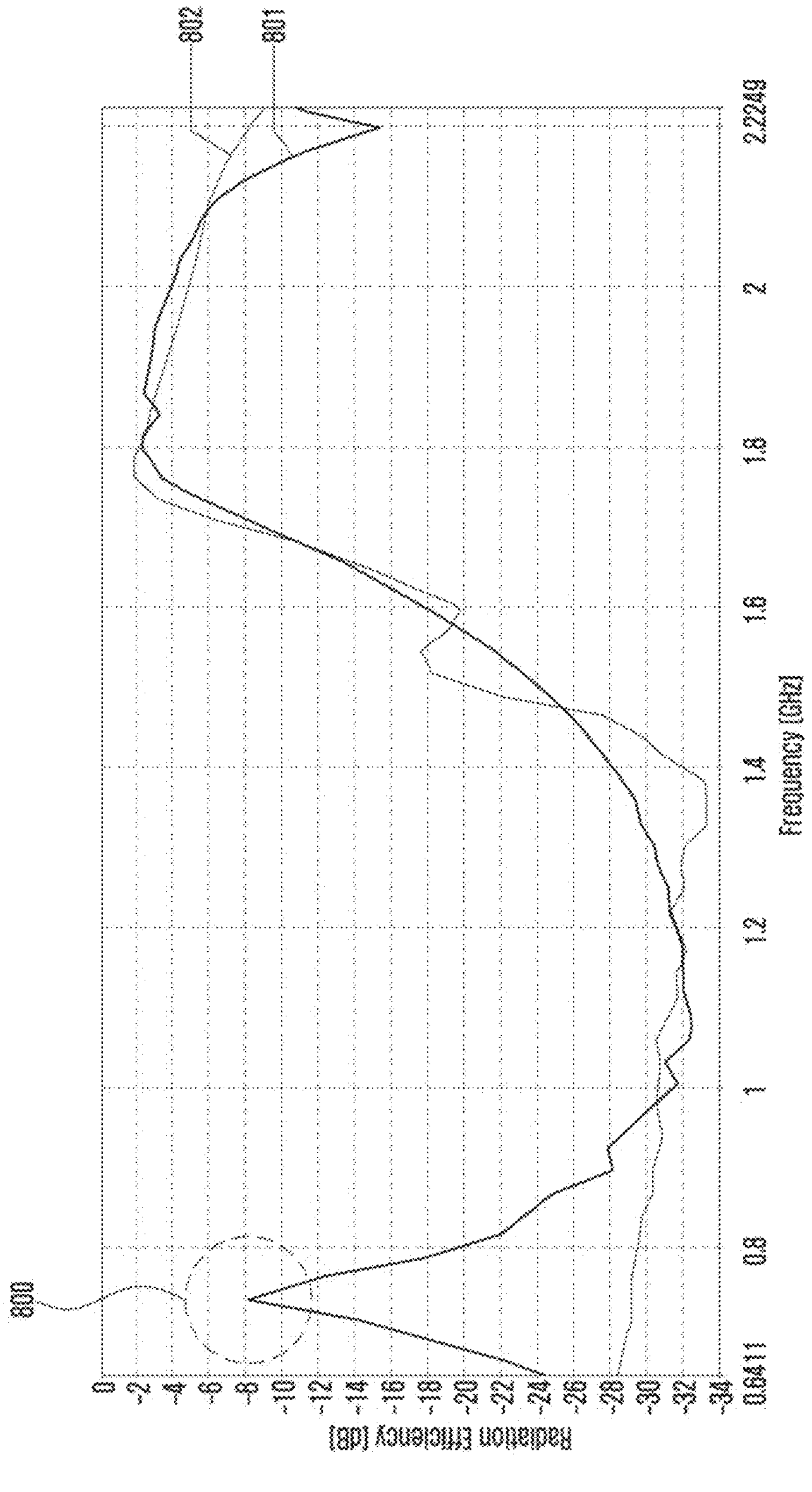
FIG. 8 shows a graph indicating antenna radiation performance of an antenna radiator according to an embodiment of the disclosure, and a graph indicating antenna radiation performance of an antenna radiator according to a comparison example.
Figure 9:
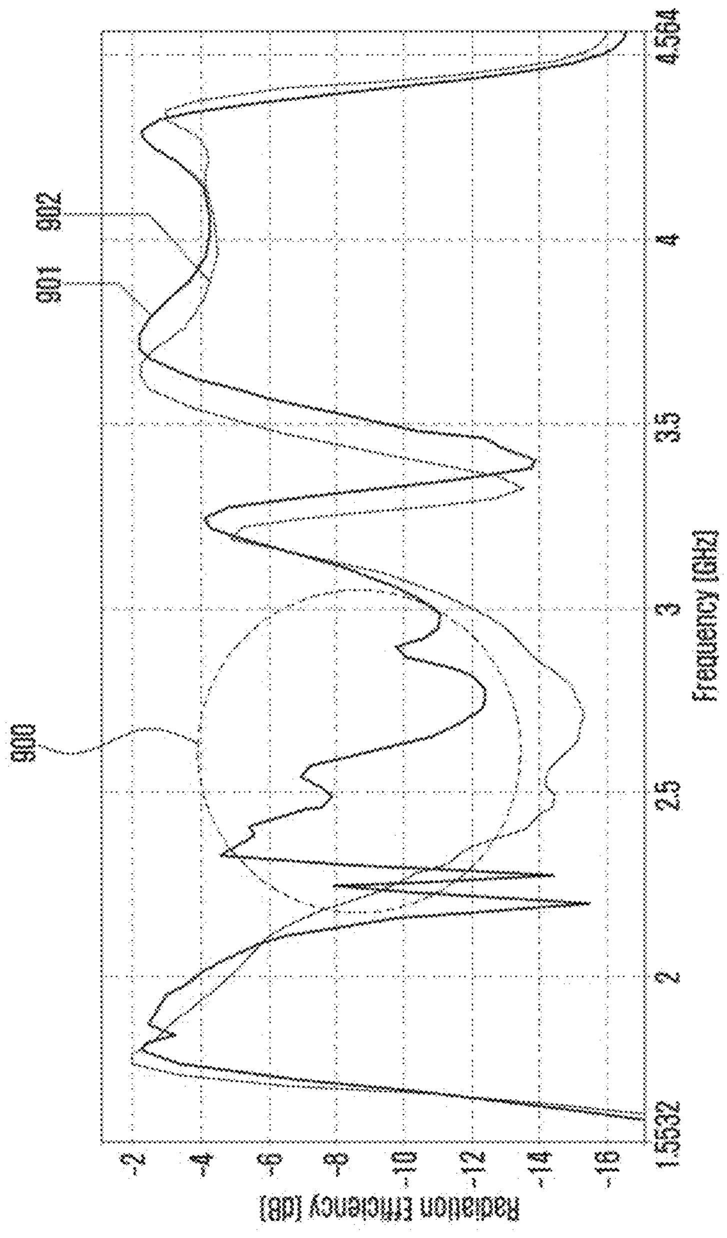
FIG. 9 shows a graph indicating antenna radiation performance of an antenna radiator according to an embodiment of the disclosure, and a graph indicating antenna radiation performance of an antenna radiator according to a comparison example.

FIG. 7 shows a graph 701 indicating antenna radiation performance of an antenna radiator according to an embodiment of the disclosure, and a graph 702 indicating antenna radiation performance of an antenna radiator according to a comparison example. FIG. 8 shows a graph 801 indicating antenna radiation performance of an antenna radiator according to an embodiment of the disclosure, and a graph 802 indicating antenna radiation performance of an antenna radiator according to a comparison example. FIG. 9 shows a graph 901 indicating antenna radiation performance of an antenna radiator according to an embodiment of the disclosure, and a graph 902 indicating antenna radiation performance of an antenna radiator according to a comparison example.

The antenna radiator according to an embodiment may correspond to the first antenna radiator 500 of the example in FIG. 5 from which the third electrical path EP3 and the second conductive part 4122 of the first frame 211 are omitted. The antenna radiator according to an embodiment may include a metal part 26 (see FIG. 5), a conductive pattern 2501 of the second display module 25, and a second electrical path EP2. The antenna radiator according to a comparison example may include a metal part 26 (see FIG. 5).

With reference to FIGS. 7, 8 and 9, compared with the antenna radiator according to a comparison example, the antenna radiator according to an embodiment can improve antenna radiation performance in multiple bands and/or in broadband due to the conductive pattern 2501 (see FIG. 5) of the second display module 25 included as an additional radiation region. The antenna radiator according to an embodiment may have a first resonant frequency (refer to indicia 800) included in LB (about 600 MHz to about 1 GHz) and a second resonant frequency (refer to indicia 900) included in MB (about 1 GHz to about 2.3 GHz). Compared with the antenna radiator according to a comparison example, the antenna radiator according to an embodiment can smoothly transmit and/or receive an electromagnetic signal of a frequency (or, operating frequency, usage frequency) selected or specified in LB and/or MB.

Figure 10:
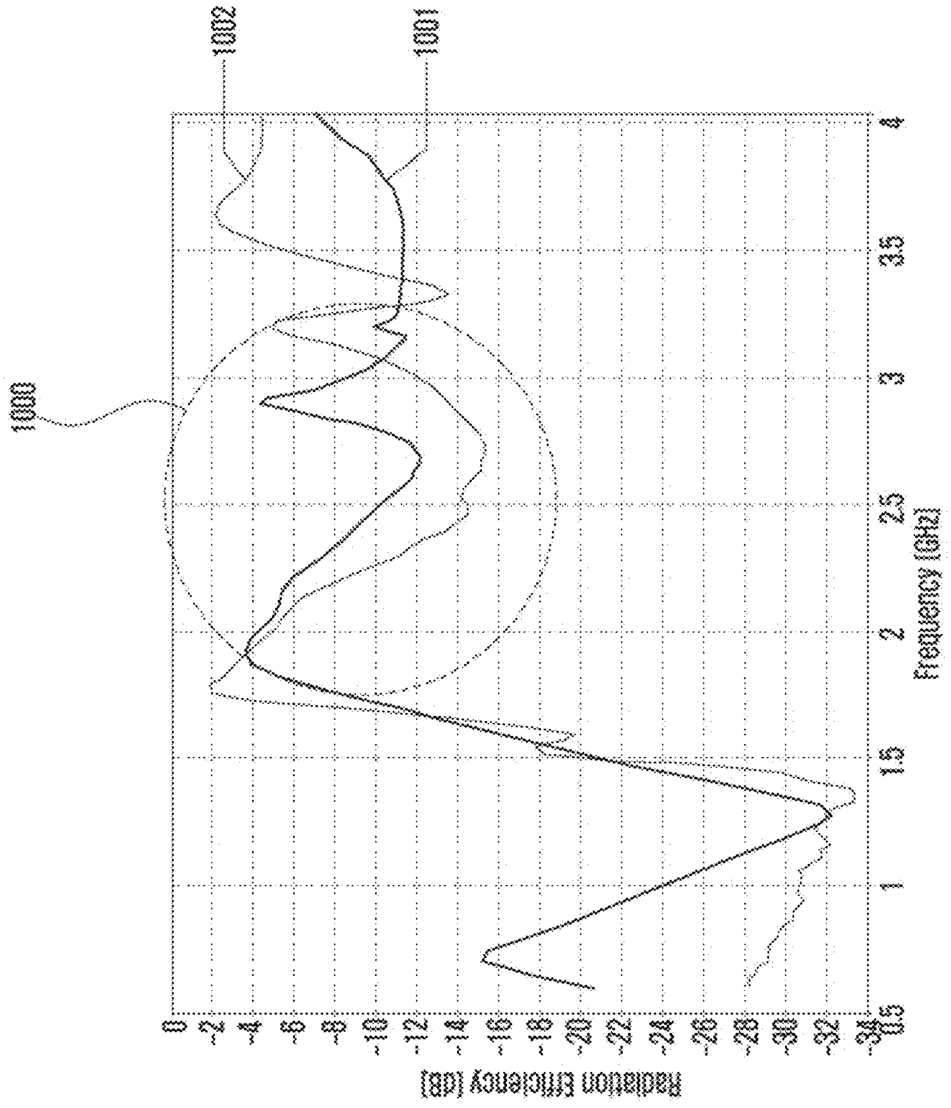
FIG. 10 shows a graph indicating antenna radiation performance of a first antenna radiator in FIG. 5 according to an embodiment of the disclosure, and a graph indicating antenna radiation performance of an antenna radiator according to a comparison example.

FIG. 10 shows a graph 1001 indicating antenna radiation performance of a first antenna radiator 500 in FIG. 5 according to an embodiment of the disclosure, and a graph 1002 indicating antenna radiation performance of an antenna radiator according to a comparison example.

The antenna radiator according to a comparison example may include a metal part 26 (see FIG. 5).

With reference to FIG. 10, compared with the antenna radiator according to a comparison example, the first antenna radiator 500 according to an embodiment can improve antenna radiation performance in multiple bands and/or in broadband. Compared with the antenna radiator according to an embodiment of FIG. 9, the first antenna radiator 500 according to an embodiment of FIG. 10 can expand the bandwidth in MB (refer to indicia 1000) due to the second conductive part 4122 (see FIG. 5) of the first frame 211 configured as an additional radiation region.

Figure 11:
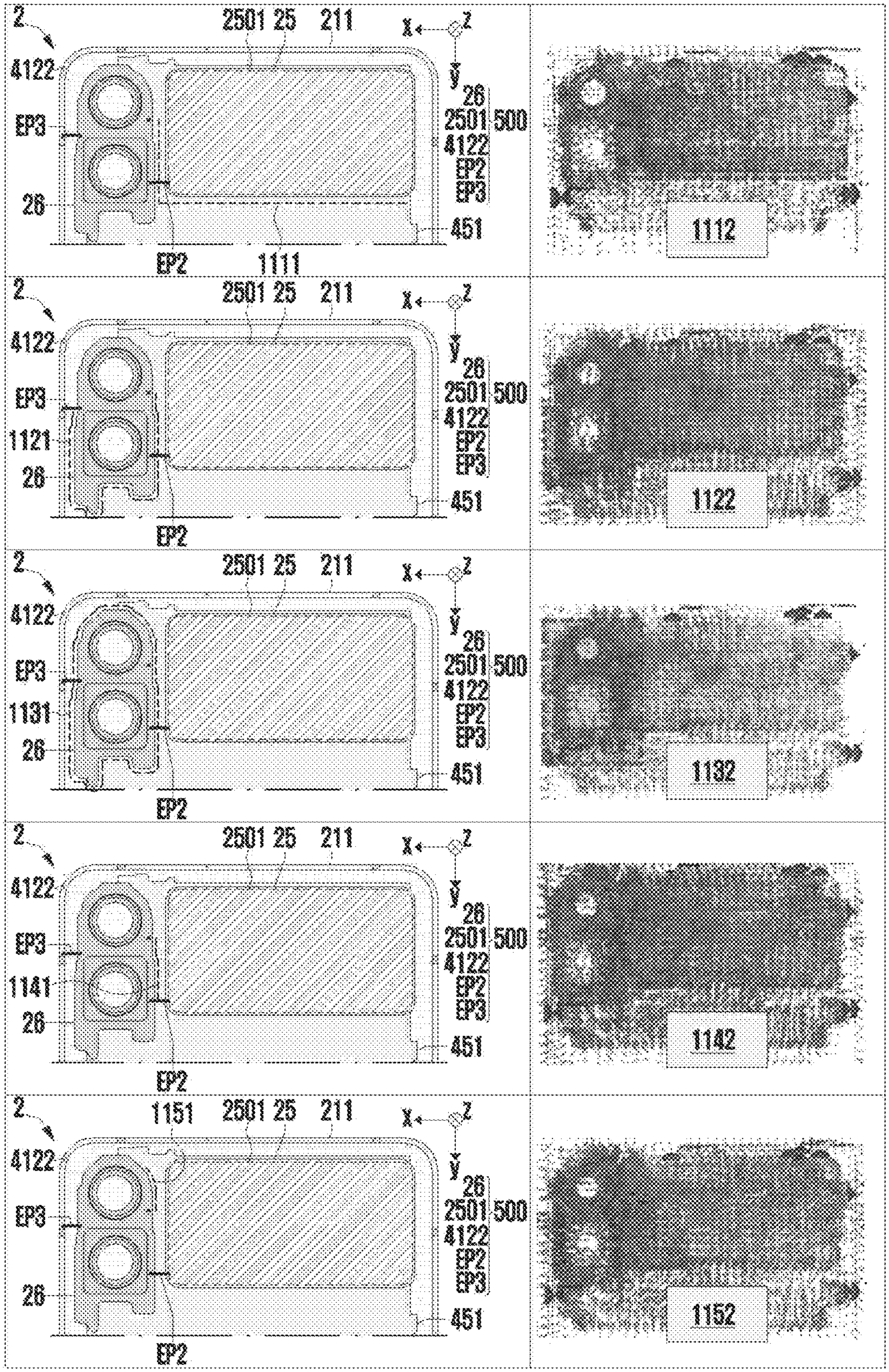
FIG. 11 shows multiple views of a part of a foldable electronic device according to an embodiment of the disclosure, and corresponding diagrams showing a current path (or surface current distribution) in the first antenna radiator when a radiation current is supplied to the feeding point.

FIG. 11 show multiple views of a part of the foldable electronic device 2 according to an embodiment of the disclosure and multiple diagrams showing a current path (or, surface current distribution) in the first antenna radiator 500 when a radiation current is supplied (or, fed) to the feeding point.

With reference to FIG. 11, the first antenna radiator 500 may resonate in multiple bands. The first antenna radiator 500 may have multiple different resonant frequencies based on the plural electrical paths 1111, 1121, 1131, 1141 and 1151 on the first antenna radiator 500. According to various embodiments, due to a combination of the metal part 26 (e.g., camera cover, camera decoration), the conductive pattern 2501 of the second display module 25, the second conductive part 4122 of the first frame 211, the second electrical path EP2, and the third electrical path EP3, based on the shape of the first antenna radiator 500 and the feeding point FP, plural electrical paths for different resonant frequencies may be provided on the first antenna radiator 500.

According to an embodiment, the first antenna radiator 500 may have a first resonant frequency (e.g., about 0.75 GHz) corresponding to a resonant length of the electrical path 1111 on the first antenna radiator 500. When a radiation current is supplied to the feeding point FP, due to the path (e.g., current path or surface current distribution) through which the radiation current flows in the first antenna radiator 500 (refer to indicia 1112), a radiation field (or, electromagnetic field) capable of transmitting and/or receiving electromagnetic waves of the first resonant frequency may be formed.

According to an embodiment, the first antenna radiator 500 may have a second resonant frequency (e.g., about 1.8 GHz) corresponding to a resonant length of the electrical path 1121 on the first antenna radiator 500. When a radiation current is supplied to the feeding point FP, due to the path (e.g., current path or surface current distribution) through which the radiation current flows in the first antenna radiator 500 (refer to indicia 1122), a radiation field (or, electromagnetic field) capable of transmitting and/or receiving electromagnetic waves of the second resonant frequency may be formed.

According to an embodiment, the first antenna radiator 500 may have a third resonant frequency (e.g., about 2.2 GHz) corresponding to a resonant length of the electrical path 1131 on the first antenna radiator 500. When a radiation current is supplied to the feeding point FP, due to the path (e.g., current path or surface current distribution) through which the radiation current flows in the first antenna radiator 500 (refer to indicia 1132), a radiation field (or, electromagnetic field) capable of transmitting and/or receiving electromagnetic waves of the third resonant frequency may be formed.

According to an embodiment, the first antenna radiator 500 may have a fourth resonant frequency (e.g., about 2.6 GHz) corresponding to a resonant length of the electrical path 1141 on the first antenna radiator 500. When a radiation current is supplied to the feeding point FP, due to the path (e.g., current path or surface current distribution) through which the radiation current flows in the first antenna radiator 500 (refer to indicia 1142), a radiation field (or, electromagnetic field) capable of transmitting and/or receiving electromagnetic waves of the fourth resonant frequency may be formed.

According to an embodiment, the first antenna radiator 500 may have a fifth resonant frequency (e.g., about 3.7 GHz) corresponding to a resonant length of the electrical path 1151 on the first antenna radiator 500. When a radiation current is supplied to the feeding point FP, due to the path (e.g., current path or surface current distribution) through which the radiation current flows in the first antenna radiator 500 (refer to indicia 1152), a radiation field (or, electromagnetic field) capable of transmitting and/or receiving electromagnetic waves of the fifth resonant frequency may be formed.

Figure 12:
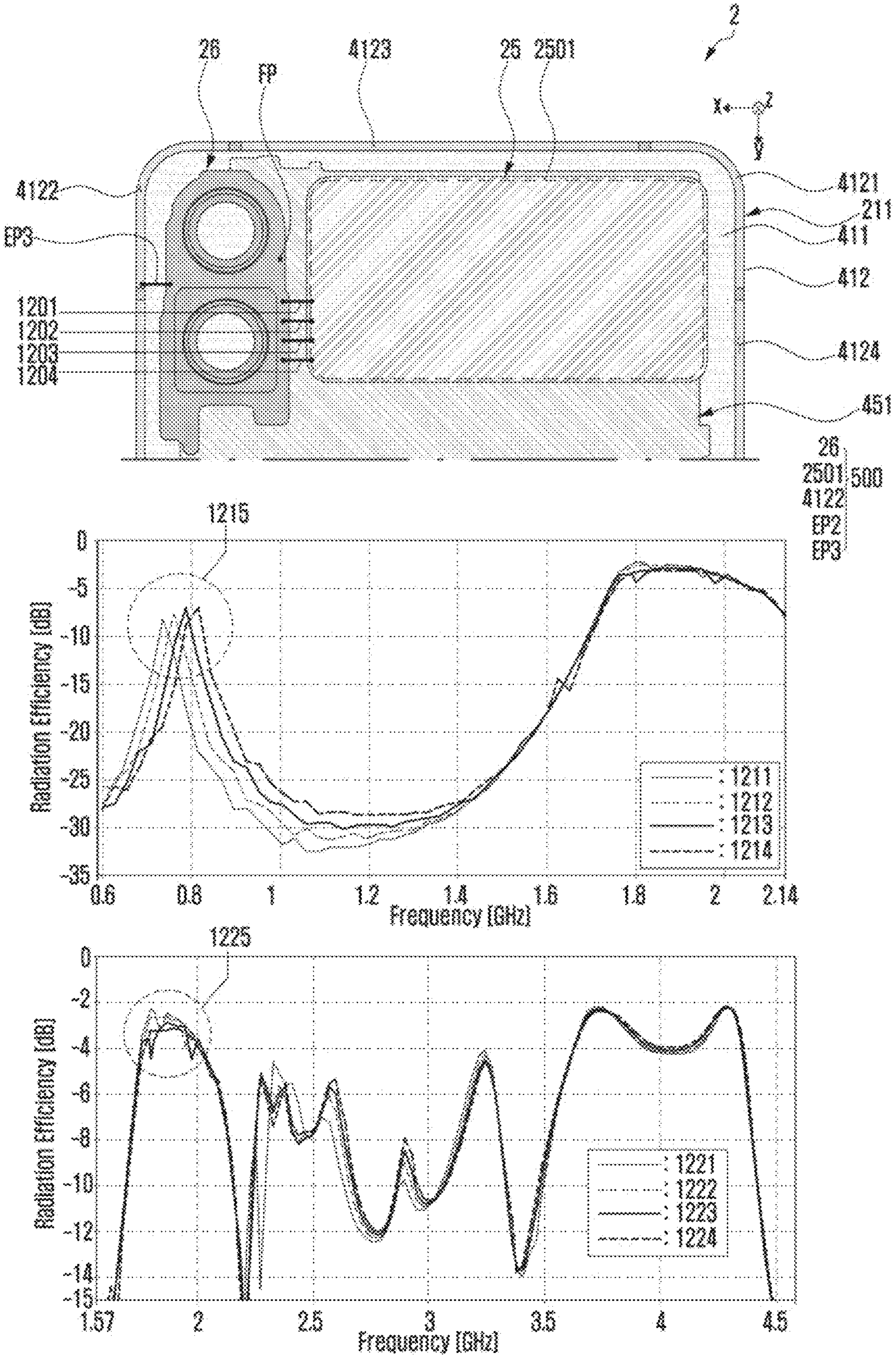
FIG. 12 is a view illustrating a part of a foldable electronic device according to various embodiments of the disclosure, and graphs indicating antenna radiation performance of the first antenna radiator depending on the position of a second electrical path.

FIG. 12 is a view illustrating a part of the foldable electronic device 2 according to various embodiments of the disclosure, and further shows graphs indicating antenna radiation performance of the first antenna radiator 500 depending on the position of a second electrical path EP2.

In FIG. 12, the graph indicated by indicia 1211 and the graph indicated by indicia 1221 indicate antenna radiation performance of the first antenna radiator 500 when the second electrical path EP2 (see FIG. 5) electrically connecting the metal part 26 and the conductive pattern 2501 of the second display module 25 is provided at a first position as indicated by indicia 1201. The graph indicated by indicia 1212 and the graph indicated by indicia 1222 indicate antenna radiation performance of the first antenna radiator 500 when the second electrical path EP2 is provided at a second position as indicated by indicia 1202. The graph indicated by indicia 1213 and the graph indicated by indicia 1223 indicate antenna radiation performance of the first antenna radiator 500 when the second electrical path EP2 is provided at a third position as indicated by indicia 1203. The graph indicated by indicia 1214 and the graph indicated by indicia 1224 indicate antenna radiation performance of the first antenna radiator 500 when the second electrical path EP2 is provided at a fourth position as indicated by indicia 1204. In the illustrated example, the first position, the second position, the third position, and the fourth position represent, respectively, cases in which the position where one end of the second electrical path EP2 is electrically connected to the metal part 26 and the position where the other end of the second electrical path EP2 is electrically connected to the conductive pattern 2501 of the second display module 25 are varied in the y-axis direction between the metal part 26 and the conductive pattern 2501 of the second display module 25. As indicated by indicia 1215, when the position of the second electrical path EP2 is changed, due to the electrical path (e.g., see electrical path 1111 in FIG. 11) corresponding to LB (about 600 MHz to about 1 GHz) and a change in its resonant length, the resonant frequency of the first antenna radiator 500 corresponding to LB may be changed. As indicated by indicia 1215 and 1225, compared with the electrical path corresponding to LB and its resonant length, the electrical path (e.g., see electrical path 1121 or 1131 in FIG. 11) corresponding to MB (about 1 GHz to about 2.3 GHz) and its resonant length are less affected by a change in position of the second electrical path EP2. In a state where antenna radiation performance is secured first in MB, the position of the second electrical path EP may be determined so that antenna radiation performance can be secured in LB.

Figure 13:
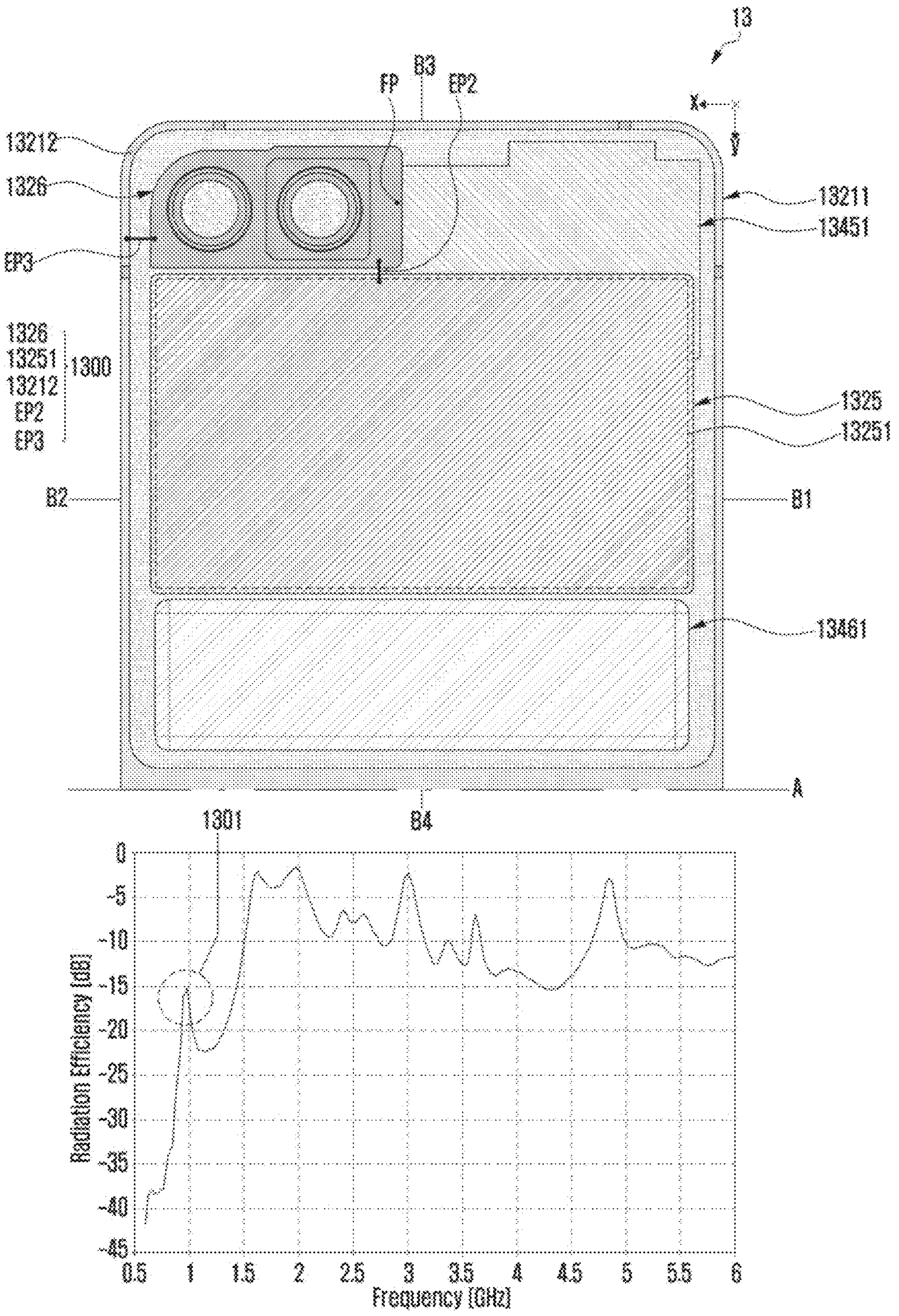
FIG. 13 is a view illustrating a part of a foldable electronic device and a graph indicating antenna radiation performance of the foldable electronic device according to various embodiments of the disclosure.

FIG. 13 is a view illustrating a part of a foldable electronic device 13 and a graph indicating antenna radiation performance of the foldable electronic device 13 according to various embodiments of the disclosure.

With reference to FIG. 13, the foldable electronic device 13 may be implemented by changing or modifying the foldable electronic device 2 as compared to the embodiment of FIG. 5. The foldable electronic device 13 may include a first frame 13211 (e.g., first frame 211 in FIG. 5), a first printed circuit board 13451, a first battery 13461 (e.g., first battery 461 in FIG. 5), a second display module 1325 (e.g., second display module 25 in FIG. 5), a metal part 1326 (e.g., metal part 26 of FIG. 5), a second electrical path EP2, and/or a third electrical path EP3.

According to an embodiment, when viewed from above the first cover 212 (see FIG. 2) (e.g., viewed in positive z-axis direction), the metal part 1326 (e.g., camera cover or camera decoration) may be positioned closer to the third bezel B3 of the first frame 13211 than the second display module 1325. When viewed from above the first cover 212 (see FIG. 2), the first battery 13461 may be positioned closer to the fourth bezel B4 of the first frame 13211 than the second display module 1325. When viewed from above the first cover 212 (see FIG. 2), the second display module 1325 may be positioned between the metal part 1326 and the first battery 13461. For example, when viewed from above the first cover 212 (see FIG. 2), the second display module 1325, the metal part 1326, and the first battery 13461 may not substantially overlap. For example, when viewed from above the first cover 212 (see FIG. 2), the first printed circuit board 13451 may overlap the metal part 1326 and/or the second display module 1325 and may not substantially overlap the first battery 13461. For example, a portion of the first printed circuit board 13451 may be positioned between the second display module 1325 and the first support (e.g., first support 411 in FIG. 5) of the first frame 13211. For example, a portion of the first printed circuit board 13451 may be positioned between the metal part 1326 and the first support (e.g., first support 411 in FIG. 5) of the first frame 211.

According to an embodiment, the second electrical path EP2 may electrically connect the conductive pattern 13251 (e.g., conductive pattern 2501 in FIG. 5) of the second display module 1325 and the metal part 1326. For example, the third electrical path EP3 may electrically connect the metal part 1326 and the conductive part 13212 (e.g., second conductive part 4122 in FIG. 5) of the first frame 13211. The foldable electronic device 13 may provide an antenna radiator 1300 (e.g., first antenna radiator 500 in FIG. 5) composed of the metal part 1326, the conductive pattern 13251 of the second display module 1325, the conductive part 13212 of the first frame 13211, the second electrical path EP2, and/or the third electrical path EP3. The antenna radiator 1300 according to the embodiment of FIG. 13 may be a variant of the first antenna radiator 500 according to the embodiment of FIG. 5 obtained by making a change to the shape or position of the metal part 1326, the shape or position of the conductive pattern 13251 of the second display module 1325, the relative position between the point of the metal part 1326 to which the second electrical path EP2 is connected and the feeding point FP, the relative position between the point of the conductive pattern 13251 of the second display module 1325 to which the second electrical path EP2 is connected and the feeding point FP, and/or the relative position between the point of the metal part 1326 to which the third electrical path EP3 is connected and the feeding point FP.

According to an embodiment, a plurality of electrical paths for different resonant frequencies may be provided on the antenna radiator 1300 based on the shape of the antenna radiator 1300 due to the combination of the metal part 1326, the conductive pattern 13251 of the second display module 1325, the conductive part 13212 of the first frame 13211 (e.g., second conductive part 4122), the second electrical path EP2, and the third electrical path EP3, and the feeding point FP on the metal part 1326. In an embodiment, due to the plural electrical paths on the antenna radiator 1300, the antenna radiator 1300 may form a radiation field (or, electromagnetic field) capable of transmitting and/or receiving an electromagnetic wave of a resonant frequency included in LB (about 600 MHz to about 1 GHz) (refer to indicia 1301), an electromagnetic wave of a resonant frequency included in MB, and/or an electromagnetic wave of a resonant frequency included in HB.

Figure 14:
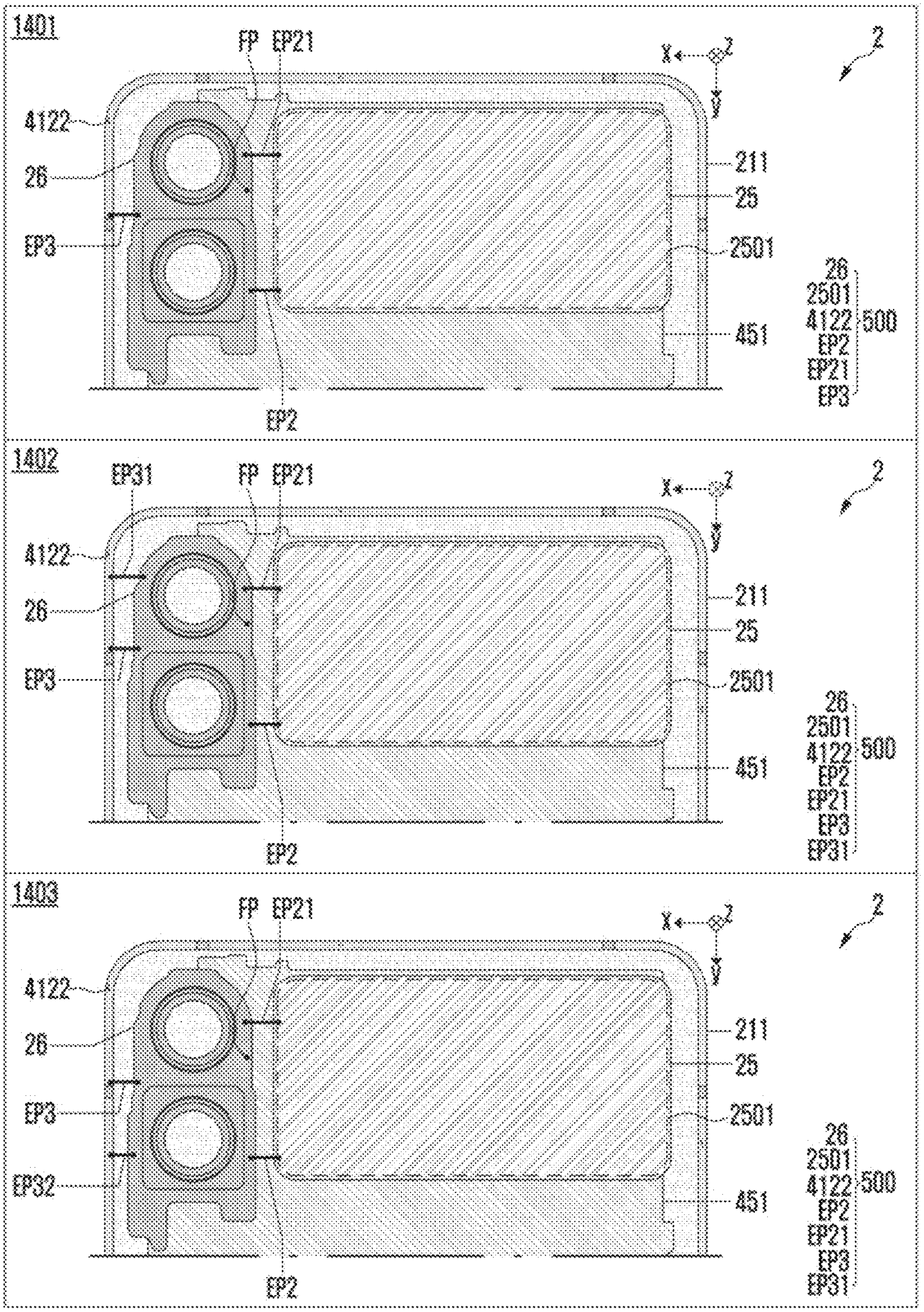
FIG. 14 shows multiple views illustrating a part of a foldable electronic device according to various embodiments of the disclosure.

FIG. 14 show multiple views illustrating a part of a foldable electronic device 2 according to various embodiments of the disclosure.

With reference to part 1401 of FIG. 14, the first antenna radiator 500 included in the foldable electronic device 2 may include another second electrical path EP21 electrically connecting the conductive pattern 2501 of the second display module 25 and the metal part 26.

With reference to part 1402 of FIG. 14, the first antenna radiator 500 included in the foldable electronic device 2 may include another third electrical path EP31 electrically connecting the metal part 26 and the second conductive part 4122 of the first frame 211. In various embodiments, one of the second electrical paths EP2 and EP21 may be omitted.

With reference to part 1403 of FIG. 14, the first antenna radiator 500 included in the foldable electronic device 2 may include another third electrical path EP32 electrically connecting the metal part 26 and the fourth conductive part 4124 of the first frame 211. In various embodiments, one of the second electrical paths EP2 and EP21 may be omitted.

Various embodiments of the disclosure may be applied to various other types of electronic devices without being limited to the foldable electronic device 2. For example, a bar-type electronic device may include a housing constituting a front surface of the electronic device, a rear surface of the electronic device, and a side surface of the electronic device. The housing may include a first plate (e.g., front plate) constituting the front surface of the bar-type electronic device. The housing may include a second plate (e.g., rear plate) constituting the rear surface of the bar-type electronic device. The housing may include a lateral member (or, side, bezel, or lateral bezel structure) constituting the side surface of the bar-type electronic device. The lateral member may surround a space between the first plate and the second plate. The bar-type electronic device may include a first display module, a second display module, and a camera module positioned in the internal space of the housing. The first display module may be seen through the first plate. The second display module may be seen through the second plate. In various embodiments, the second display module may be positioned in a hole provided in the second plate, and may constitute a portion of the external appearance of the bar-type electronic device. The camera module may be positioned in the internal space of the housing in alignment with a metal part (e.g., metal part 26 in FIG. 5) positioned in the hole provided in the second plate. An antenna radiator (e.g., first antenna radiator 500 in FIG. 5) may be configured in a form of electrically connecting the metal part, the conductive pattern included in the second display module (e.g., conductive pattern 2501 in FIG. 5), and at least one conductive part (e.g., second conductive part 4122 in FIG. 5) included in the lateral member. It is possible to provide various electronic devices in which the first display module and the second display module face in different directions, where the conductive pattern (e.g., conductive pattern 2501 in FIG. 5) included in the second display module may be implemented as at least a part of the antenna radiator.

According to an example embodiment of the disclosure, an electronic device 2 may include a housing 20, a first display module 24, a second display module 25, a metal part 26, and a wireless communication circuit 620. The housing 20 may provide the external appearance of the electronic device 2. The second display module 25 may face in a direction different from that of the first display module 24. The metal part 26 may be electrically connected to a conductive pattern 2501 included in the second display module 25. The wireless communication circuit 620 may be electrically connected to the metal part 26 or the conductive pattern 2501.

According to an example embodiment of the disclosure, the metal part 26 may provide a portion of the external appearance of the electronic device 2.

According to an example embodiment of the disclosure, the metal part 26 may be connected to a camera module 306 or 307 included in the electronic device 2.

According to an example embodiment of the disclosure, the conductive pattern 2501 may be included in one of plural layers included in the second display module 25.

According to an example embodiment of the disclosure, the conductive pattern 2501 may be formed to shield EMI for the second display module 25.

According to an example embodiment of the disclosure, the electronic device 2 may include a front surface through which the first display module 24 is visible, and a rear surface facing in a direction opposite to the front surface. The second display module 25 and the metal part 26 may be positioned in correspondence to the rear surface.

According to an example embodiment of the disclosure, the housing 20 may include a side 412 extended along the edge of the first display module 24 and constituting a side surface of the electronic device 2. The metal part 26 or the conductive pattern 2501 may be electrically connected to a conductive part 4122 included in the side 412.

According to an example embodiment of the disclosure, the housing 20 may be a foldable housing 20 configured to allow the first display module 24 to be folded.

According to an example embodiment of the disclosure, the housing 20 may include a first housing 21, a second housing 22, and a hinge section H connecting the first housing 21 and the second housing 22. The first display module 24 may include a first display area ① disposed in the first housing 21, a second display area ② disposed in the second housing 22, and a third display area ③ extending the first display area ① and the second display area ② and positioned in correspondence to the hinge section H. The second display module 25 may be positioned in the first housing 21 and may face in an opposite direction to the first display area ①. The metal part 26 may be positioned in the first housing 21.

According to an example embodiment of the disclosure, the electronic device 2 may further include a matching circuit 630 disposed on an electrical path EP1 electrically connecting the metal part 26 or the conductive pattern 2501 to the wireless communication circuit 620.

According to an example embodiment of the disclosure, the electronic device 2 may further include a matching circuit disposed on an electrical path EP2 electrically connecting the metal part 26 and the conductive pattern 2501.

According to an example embodiment of the disclosure, plural positions on the metal part 26 or conductive pattern 2501 may be electrically connected to the wireless communication circuit 620.

According to an example embodiment of the disclosure, the electronic device 2 may include a plurality of electrical paths electrically connecting the metal part 26 and the conductive pattern 2501.

According to an example embodiment of the disclosure, the metal part 26 or the conductive pattern 2501 may be electrically connected to the ground included in the electronic device.

According to an example embodiment of the disclosure, the electronic device 2 may further include a printed circuit board 451 accommodated in the housing 20. The wireless communication circuit 620 may be disposed on the printed circuit board 451. The metal part 26 or the conductive pattern 2501 may be electrically connected to the wireless communication circuit 620 through a flexible conductive part disposed on the printed circuit board 451.

Embodiments shown in the disclosure and drawings are presented as specific examples to explain the technical content and help understanding of the embodiments, and are not intended to limit the scope of the embodiments. Therefore, the scope of various embodiments of the disclosure should be construed as including both those embodiments disclosed herein and changes or modifications thereof

What is claimed is:

1. An electronic device comprising:

a housing forming an exterior of the electronic device;

a first display;

a second display facing in a direction different from that of the first display, wherein the second display comprises a conductive pattern;

a metal part electrically connected to the conductive pattern; and a wireless communication circuit electrically connected to at least one of the metal part or the conductive pattern, wherein the housing comprises a first housing, a second housing, and a hinge section connecting the first housing and the second housing, wherein the first display comprises a first display area disposed in the first housing, a second display area disposed in the second housing, and a third display area connecting the first display area and the second display area and positioned in correspondence to the hinge section, wherein the second display is disposed in the first housing, wherein the direction in which the second display faces is opposite to a direction in which the first display area faces, and wherein the metal part is disposed in the first housing.

2. The electronic device of claim 1, wherein the metal part forms a portion of the exterior of the electronic device.

3. The electronic device of claim 2, further comprising:

a camera, wherein the metal part is connected to the camera.

4. The electronic device of claim 1, wherein the second display further comprises a plurality of layers and the conductive pattern comprises a layer of the plurality of layers.

5. The electronic device of claim 1, wherein the conductive pattern is configured to shield the second display from electromagnetic interference.

6. The electronic device of claim 1, further comprising:

a front surface; and a rear surface facing in a direction opposite to the front surface, wherein the first display is disposed on the front surface, and the second display and the metal part are disposed on the rear surface.

7. The electronic device of claim 1, wherein the housing comprises a side comprising a conductive part, wherein the side extends along an edge of the first display and forms a side surface of the electronic device, and wherein at least one of the metal part or the conductive pattern is electrically connected to the conductive part of the side.

8. The electronic device of claim 1, wherein the housing is configured to allow the first display to be folded.

9. The electronic device of claim 1, further comprising:

a matching circuit disposed on an electrical path electrically connecting at least one of the metal part or the conductive pattern to the wireless communication circuit.

10. The electronic device of claim 1, further comprising:

a matching circuit disposed on an electrical path electrically connecting the metal part and the conductive pattern.

11. The electronic device of claim 1, wherein the wireless communication circuit is electrically connected to a plurality of positions on at least one of the metal part or the conductive pattern.

12. The electronic device of claim 1, further comprising:

a plurality of electrical paths electrically connecting the metal part and the conductive pattern.

13. The electronic device of claim 1, wherein at least one of the metal part or the conductive pattern is electrically grounded.

14. The electronic device of claim 1, further comprising:

a printed circuit board accommodated in the housing and having the wireless communication circuit disposed thereon, wherein at least one of the metal part or the conductive pattern is electrically connected to the wireless communication circuit through a flexible conductive part disposed on the printed circuit board.

15. An electronic device comprising:

a housing configured to be foldable along an axis, wherein the housing comprises a first side, a second side, and a side part disposed between the first side and the second side;

a display disposed on the second side of the housing, wherein the display comprises a conductive pattern;

a metal part disposed on the second side of the housing;

a wireless communication circuit; and a matching circuit, wherein the housing is configured to fold inward when the housing is in a folded state and the second side forms an exterior of the electronic device when the housing is in the folded state, wherein the side part comprises a conductive part, wherein the conductive part of the side part, the conductive pattern of the display, and the metal part are electrically connected to the wireless communication circuit, wherein the conductive part of the side part is electrically connected to the metal part by a first connector, wherein the conductive pattern of the display is electrically connected to the metal part by a second connector, wherein the wireless communication circuit is electrically connected to at least one of the conductive part of the side part, the conductive pattern of the display, or the metal part by a third connector, wherein the conductive part of the side part, the conductive pattern of the display, the metal part, the first connector, the second connector, and the third connector form an antenna, and wherein the matching circuit is electrically connected to the antenna and is configured to modify a resonant frequency of the antenna.

16. The electronic device of claim 15, wherein the display comprises a plurality of layers and the conductive pattern comprises a layer of the plurality of layers.

17. The electronic device of claim 16, wherein the conductive pattern is configured to shield the display from electromagnetic interference.

18. The electronic device of claim 15, wherein the conductive part of the side part is electrically connected to the metal part, and the conductive pattern of the display is electrically connected to the metal part.

* * * * *